US012659041B1

(12) United States Patent
Zhang et al.

(10) Patent No.: US 12,659,041 B1
(45) Date of Patent: Jun. 16, 2026

(54) SYSTEMS AND METHODS FOR PHASE COMPENSATION

(71) Applicant: Cable Television Laboratories, Inc., Louisville, CO (US)

(72) Inventors: Junwen Zhang, Broomfield, CO (US); Mu Xu, Broomfield, CO (US); Haipeng Zhang, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 312 days.

(21) Appl. No.: 18/452,537

(22) Filed: Aug. 20, 2023

Related U.S. Application Data

(63) Continuation of application No. 17/339,740, filed on Jun. 4, 2021, now Pat. No. 11,736,199, which is a continuation-in-part of application No. 17/162,838, filed on Jan. 29, 2021, now Pat. No. 11,546,058.

(60) Provisional application No. 63/034,691, filed on Jun. 4, 2020, provisional application No. 62/967,122, filed on Jan. 29, 2020.

(51) Int. Cl.
*H04B 10/50* (2013.01)
*H04B 10/61* (2013.01)
*H04B 10/63* (2013.01)

(52) U.S. Cl.
CPC ..... *H04B 10/504* (2013.01); *H04B 10/50572* (2013.01); *H04B 10/6164* (2013.01); *H04B 10/6165* (2013.01); *H04B 10/63* (2013.01)

(58) Field of Classification Search
None
See application file for complete search history.

(56) References Cited

U.S. PATENT DOCUMENTS

| | | | |
|---|---|---|---|
| 5,115,440 A | 5/1992 | Gysel et al. | |
| 5,373,382 A | 12/1994 | Pirio et al. | |
| 5,691,989 A | 11/1997 | Rakuljic et al. | |
| 5,699,179 A | 12/1997 | Gopalakrishnan | |
| 5,761,638 A | 6/1998 | Knittle et al. | |
| 5,793,512 A | 8/1998 | Ryu | |
| 5,974,209 A | 10/1999 | Cho et al. | |
| 5,991,323 A | 11/1999 | Adams et al. | |

(Continued)

FOREIGN PATENT DOCUMENTS

| | | |
|---|---|---|
| CN | 105099570 A | 11/2015 |
| JP | H09504673 A | 5/1997 |

(Continued)

OTHER PUBLICATIONS

Generalized Sliding Window Algorithm with Applications to Frame Synchronization—S.M. Pan and D.H. Madill—Aug. 1996.

*Primary Examiner* — Darren E Wolf
(74) *Attorney, Agent, or Firm* — PdZ Patent Law, PLLC

(57) ABSTRACT

A method for phase compensation in an optical communication network includes (1) modifying a modulated signal according to one or more correction factors to generate a compensated signal, to compensate for phase rotation, (2) modulating a magnitude of an optical signal in response to a magnitude of the compensated signal, and (3) modulating a phase of the optical signal, after modulating the magnitude of the optical signal, in response to a phase of the compensated signal.

20 Claims, 24 Drawing Sheets

(56)     References Cited

U.S. PATENT DOCUMENTS

|  |  |  |  |  |
|---|---|---|---|---|
| 6,765,956 | B1 | 7/2004 | Gatherer | |
| 7,023,601 | B2 | 4/2006 | McGhan et al. | |
| 7,848,661 | B2 | 12/2010 | Iannelli | |
| 8,027,593 | B2 | 9/2011 | Zhou et al. | |
| 8,265,489 | B2 | 9/2012 | Kikuchi | |
| RE44,647 | E | 12/2013 | Iannelli | |
| 8,718,484 | B2 | 5/2014 | Dallesasse et al. | |
| 8,909,061 | B1 | 12/2014 | Varadarajan | |
| 9,112,608 | B2 | 8/2015 | Bai et al. | |
| 9,559,778 | B2 | 1/2017 | McNicol et al. | |
| 9,941,974 | B2 | 4/2018 | Yu et al. | |
| 10,816,649 | B1 | 10/2020 | Keyser et al. | |
| 2002/0033987 | A1* | 3/2002 | Fuse | H04B 10/5053 |
| | | | | 398/187 |
| 2002/0101264 | A1 | 8/2002 | Natsume | |
| 2002/0159121 | A1 | 10/2002 | Spickermann | |
| 2004/0105682 | A1 | 6/2004 | Roberts et al. | |
| 2005/0281298 | A1 | 12/2005 | Kupershmidt et al. | |
| 2006/0045214 | A1 | 3/2006 | Shiina | |
| 2006/0078336 | A1 | 4/2006 | McNicol et al. | |
| 2006/0078338 | A1 | 4/2006 | Johnson et al. | |
| 2006/0176984 | A1 | 8/2006 | Lee et al. | |
| 2006/0210282 | A1 | 9/2006 | Iannelli | |
| 2006/0238759 | A1 | 10/2006 | Okabe et al. | |
| 2007/0217524 | A1 | 9/2007 | Wang et al. | |
| 2008/0193144 | A1 | 8/2008 | Zhou et al. | |
| 2008/0317468 | A1* | 12/2008 | Villarruel | H04J 14/0298 |
| | | | | 398/68 |
| 2009/0074425 | A1* | 3/2009 | Tanaka | H04B 10/548 |
| | | | | 398/185 |
| 2009/0123153 | A1 | 5/2009 | Edirisinghe et al. | |
| 2009/0196630 | A1* | 8/2009 | Ishaug | H04B 10/697 |
| | | | | 398/193 |
| 2010/0034542 | A1 | 2/2010 | Armstrong | |
| 2010/0098436 | A1* | 4/2010 | Mahgerefteh | H04B 10/504 |
| | | | | 398/192 |
| 2010/0128744 | A1 | 5/2010 | Deladurantaye et al. | |
| 2011/0261845 | A1 | 10/2011 | Ishaug | |
| 2011/0305457 | A1 | 12/2011 | Kikuchi | |
| 2012/0213532 | A1 | 8/2012 | Hironishi et al. | |
| 2012/0263456 | A1* | 10/2012 | Tanaka | H04B 10/5055 |
| | | | | 398/25 |
| 2012/0294616 | A1* | 11/2012 | Sasaki | H04B 10/548 |
| | | | | 398/79 |
| 2013/0136449 | A1 | 5/2013 | Liu et al. | |
| 2013/0243434 | A1 | 9/2013 | Endo et al. | |
| 2013/0272719 | A1 | 10/2013 | Yan et al. | |
| 2014/0056583 | A1 | 2/2014 | Giddings et al. | |
| 2014/0169802 | A1* | 6/2014 | Magri | H04B 10/541 |
| | | | | 398/183 |
| 2014/0369694 | A1 | 12/2014 | Turitsyn et al. | |
| 2015/0095743 | A1 | 4/2015 | Sato | |
| 2015/0104196 | A1 | 4/2015 | Bae et al. | |
| 2015/0222236 | A1 | 8/2015 | Takemoto et al. | |
| 2016/0006538 | A1* | 1/2016 | Yoshida | H04B 10/6162 |
| | | | | 398/65 |
| 2016/0308664 | A1 | 10/2016 | Ishaug et al. | |
| 2017/0033530 | A1* | 2/2017 | Cress | H04B 10/58 |
| 2017/0063489 | A1 | 3/2017 | Kolze | |
| 2017/0134569 | A1 | 5/2017 | Tu et al. | |
| 2017/0180055 | A1 | 6/2017 | Yu et al. | |
| 2017/0250759 | A1 | 8/2017 | Hatae et al. | |
| 2018/0076887 | A1* | 3/2018 | Roberts | H04B 10/07953 |
| 2018/0343062 | A1 | 11/2018 | Voois et al. | |
| 2019/0074846 | A1 | 3/2019 | Hamzeh et al. | |
| 2020/0099449 | A1 | 3/2020 | Way et al. | |

FOREIGN PATENT DOCUMENTS

| | | |
|---|---|---|
| JP | H10512124 A | 11/1998 |
| JP | 2003078451 B | 2/2005 |

* cited by examiner

700

Memory 704

Distortion
Instructions
708 s(t)

H⁻¹ p(t)

706

Processor
702

1300

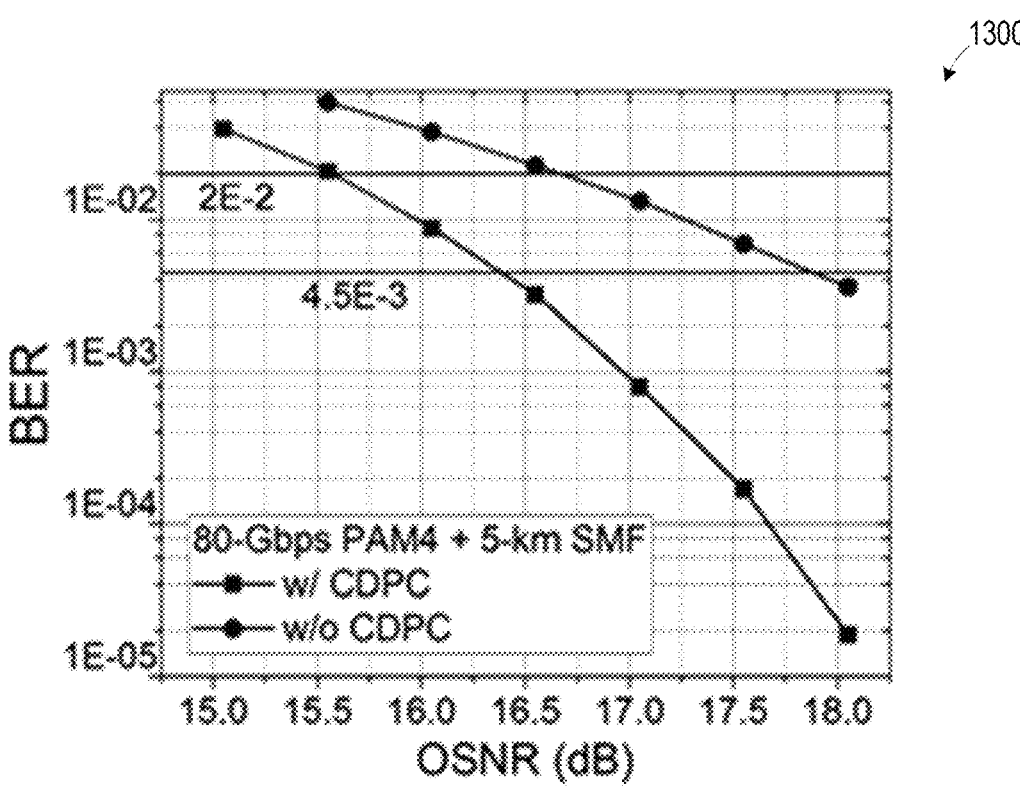

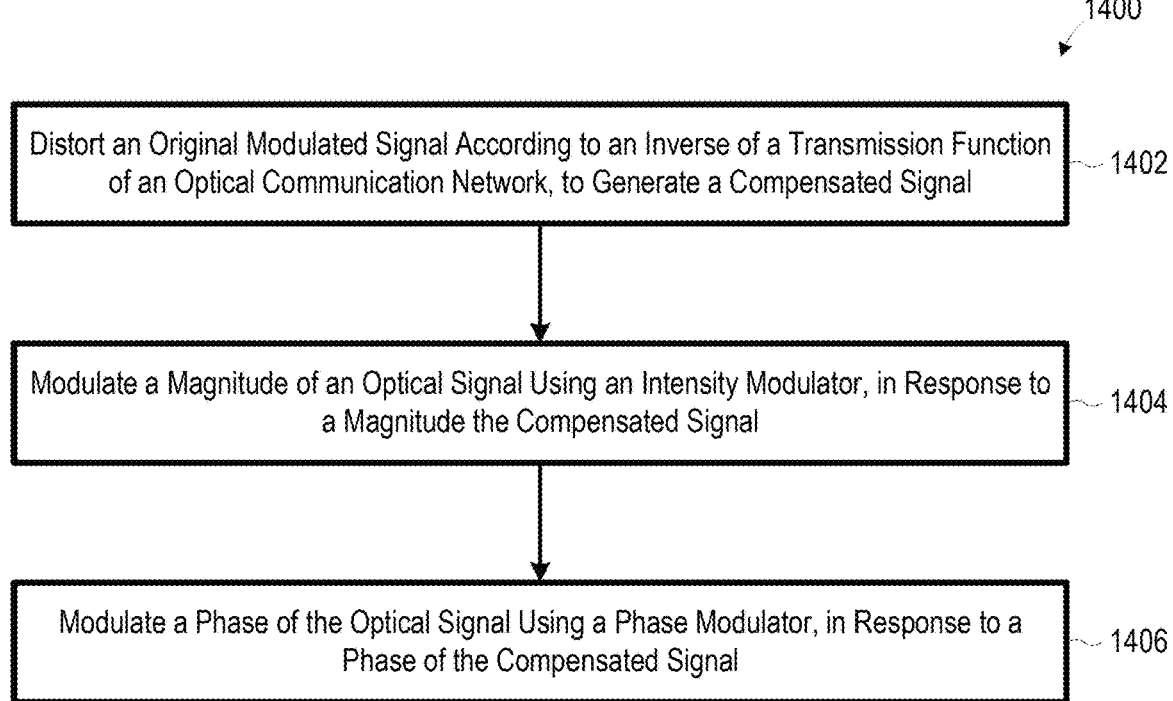

Distort an Original Modulated Signal According to an Inverse of a Transmission Function of an Optical Communication Network, to Generate a Compensated Signal ~ 1402

Modulate a Magnitude of an Optical Signal Using an Intensity Modulator, in Response to a Magnitude the Compensated Signal ~ 1404

Modulate a Phase of the Optical Signal Using a Phase Modulator, in Response to a Phase of the Compensated Signal ~ 1406

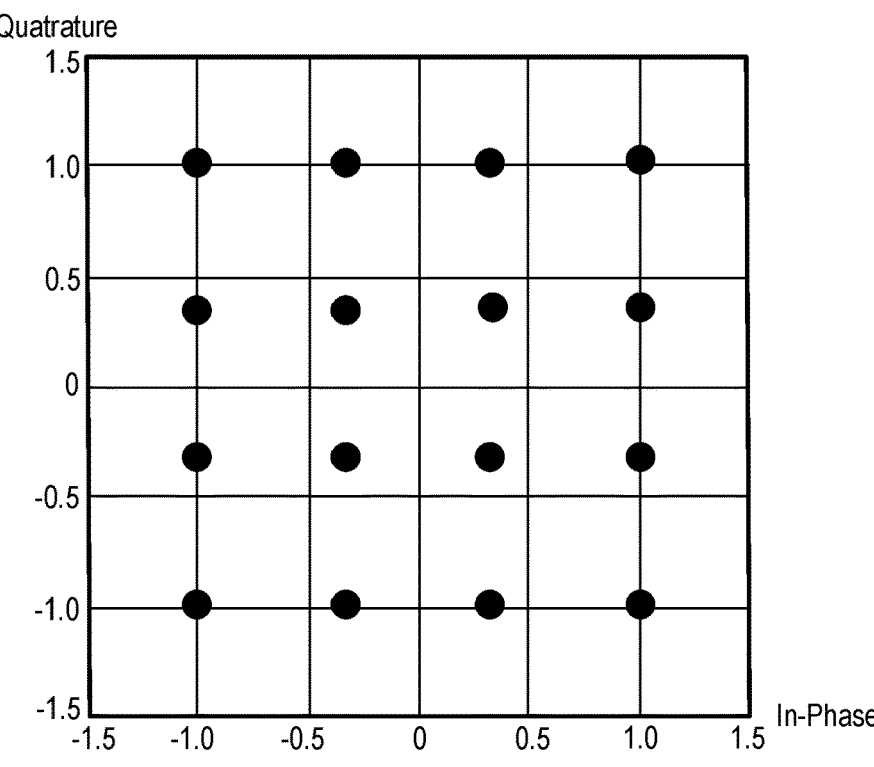
*FIG. 19*
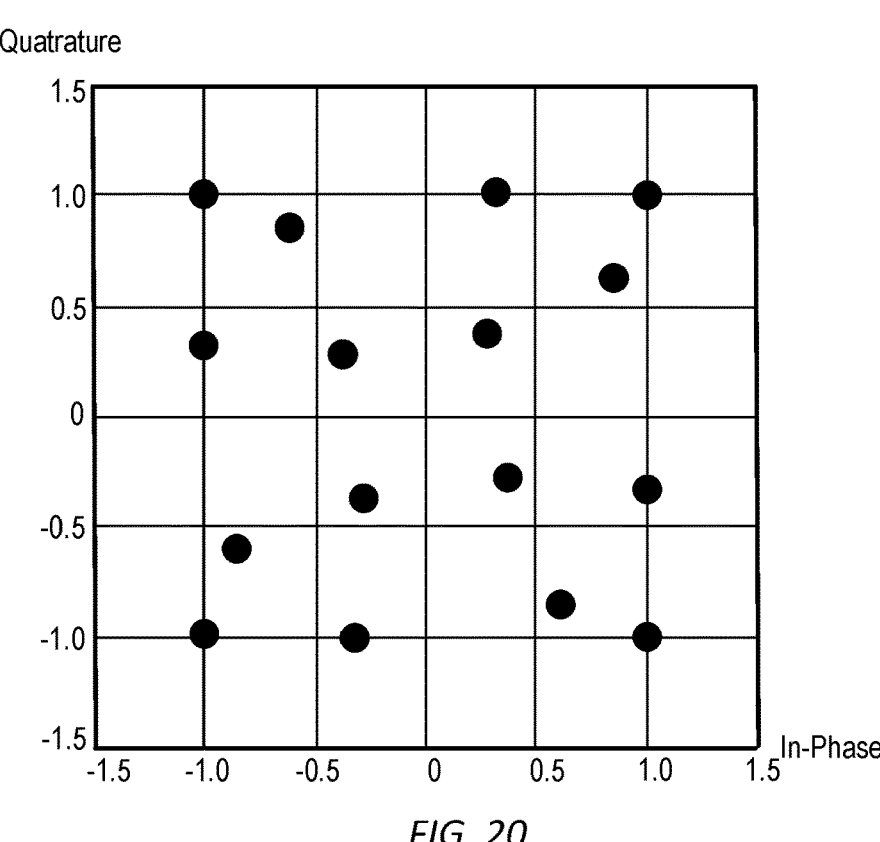
*FIG. 20*

2200

2500

2700

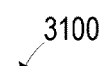
—3106
*FIG. 31*
3200
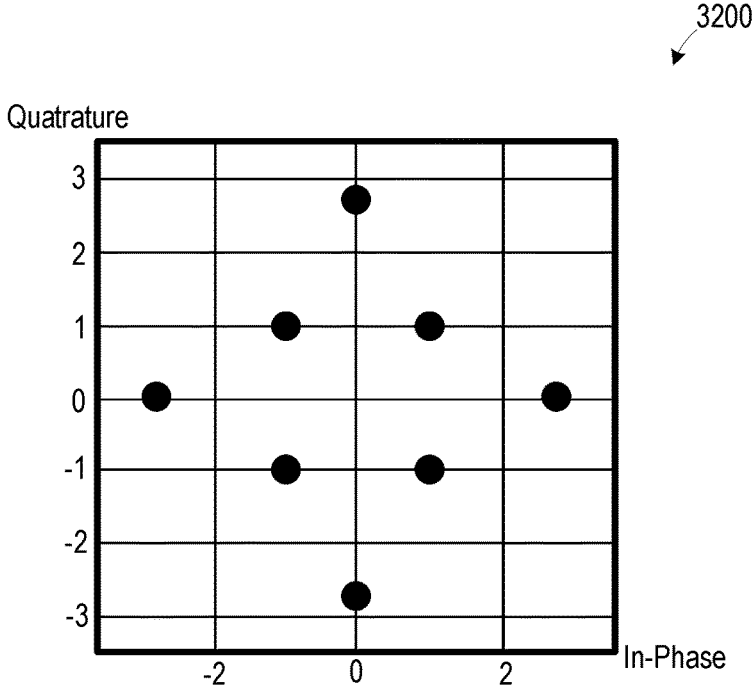
*FIG. 32*

SYSTEMS AND METHODS FOR PHASE COMPENSATION

RELATED APPLICATIONS

This application is a continuation of U.S. patent application Ser. No. 17/339,740, filed on Jun. 4, 2021, which is a continuation-in-part of U.S. patent application Ser. No. 17/162,838, filed on Jan. 29, 2021, which claims benefit of priority to U.S. Provisional Patent Application Ser. No. 62/967,122, filed on Jan. 29, 2020. U.S. patent application Ser. No. 17/339,740 also claims benefit of priority to U.S. Provisional Patent Application Ser. No. 63/034,691, filed on Jun. 4, 2020. Each of the aforementioned patent applications is incorporated herein by reference.

BACKGROUND

Communication network traffic continues to grow, such as due to emergence of new services with high bandwidth demand, including data center interconnection services, fifth generation (5G) wireless broadband services, and virtual reality services. Optical communication networks, which use an optical cable to transmit data between network nodes, are increasingly being used for data transmission, due to their inherent capability to support high bandwidth and to transport data over long distances.

BRIEF DESCRIPTION OF THE DRAWINGS

FIG. 13 is a graph of a bit error rate versus optical signal to noise ratio of two communication networks.

FIG. 14 is a flow chart of a method for chromatic dispersion pre-compensation in an optical communication network.

FIG. 19 is a scatter plot of target constellation mapping of an embodiment of the FIG. 15 transmitter system implementing 16-QAM modulation.

FIG. 20 is a scatter plot of actual constellation mapping of the transmitter system considered in FIG. 19, showing effects of phase rotation.

FIG. 31 is a block diagram of a communication network including a server and an instance of the transmitter system of FIG. 21.

FIG. 32 is a scatter plot of target constellation mapping of an embodiment of the FIG. 21 transmitter system implementing 8-QAM modulation.

DETAILED DESCRIPTION OF THE EMBODIMENTS

One promising communication network architecture for meeting growing data transmission needs is an optical communication network including single-polarized direct-detected (DD) high speed transceivers and implementing wavelength division multiplexing. This communication network architecture is relatively simple and economical compared to other optical communication network architectures, which makes it a strong candidate for many communication network applications.

Figure 1:
FIG. 1 is a graph of power versus time of a transmitting laser of a simulated optical communication network.
Figure 2:
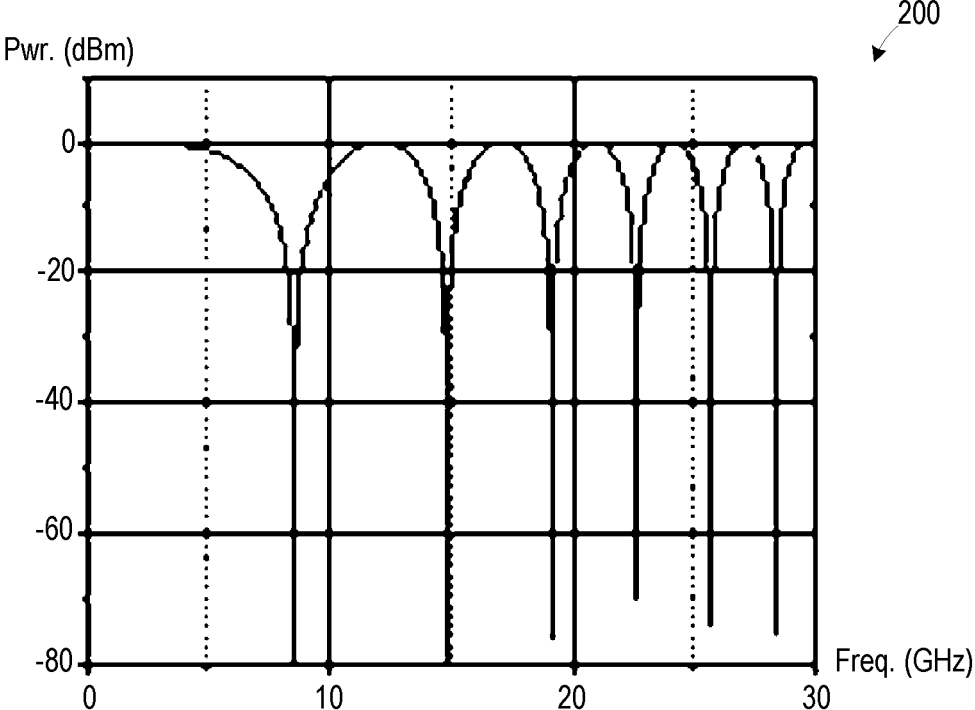
FIG. 2 is a graph of power versus frequency of a signal of the simulated optical communication network after transmission of the signal via an optical cable and detection of the signal by a receiver.

However, conventional long distance communication networks including DD high speed transceivers suffer from chromatic dispersion (CD) induced power fading, which significantly limits bandwidth and maximum optical cable distance. Chromatic dispersion is a phenomenon where different wavelengths of light traveling through an optical cable arrive at a common destination at different times. To help understand the effects of chromatic dispersion on an optical communication network, consider FIGS. 1-5, which are based on a simulated optical communication network using DD transceivers and implementing four levels of pulse-amplitude-modulation (PAM4). FIG. 1 is a graph 100 of power versus time of a transmitting laser of the simulated optical communication network, illustrating that the laser has four possible power output levels, $P_1$, $P_2$, $P_3$, and $P_4$. Each output power level is offset from an adjacent power level by a difference in power of $\Delta P$. FIG. 2 is a graph 200 of power versus frequency of a signal of the simulated optical communication network, after transmission of the signal via an optical cable and detection of the signal by a receiver. As evident from FIG. 2, the received signal does not have a flat response but instead has notches at several frequencies. The notches are caused by chromatic dispersion of the signal when traveling through the optical cable.

Figure 3:
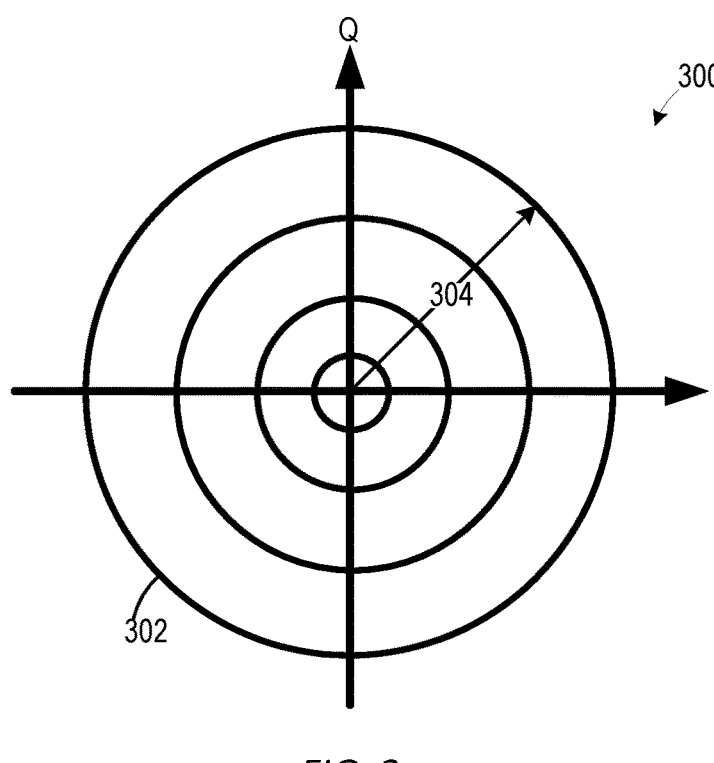
FIG. 3 illustrates possible distributions of a received signal in the simulated optical communication network.

The received signal in the simulated communication network has a complex value which can be represented by a graph 300 of FIG. 3, which illustrates possible distributions of the received signal in an in-phase (I) plane and a quadrature (Q) plane. The received signal can be located at any position on any one of four rings 302, depending on its amplitude and phase. Only one instance of ring 302 is labeled in FIG. 3 for illustrative clarity. It should be noted that while adjacent power outputs of the laser are offset by a uniform difference in power of $\Delta P$, as illustrated in FIG. 1, adjacent amplitude levels are offset by non-uniform differences in amplitude, as illustrated in FIG. 3 by separation of adjacent rings 302 in a radial 304 direction being non-uniform. This non-uniformity of radial 304 separation of rings 302 results from the relationship between signal power and amplitude, where signal amplitude is the square root of signal power.

Figure 4:
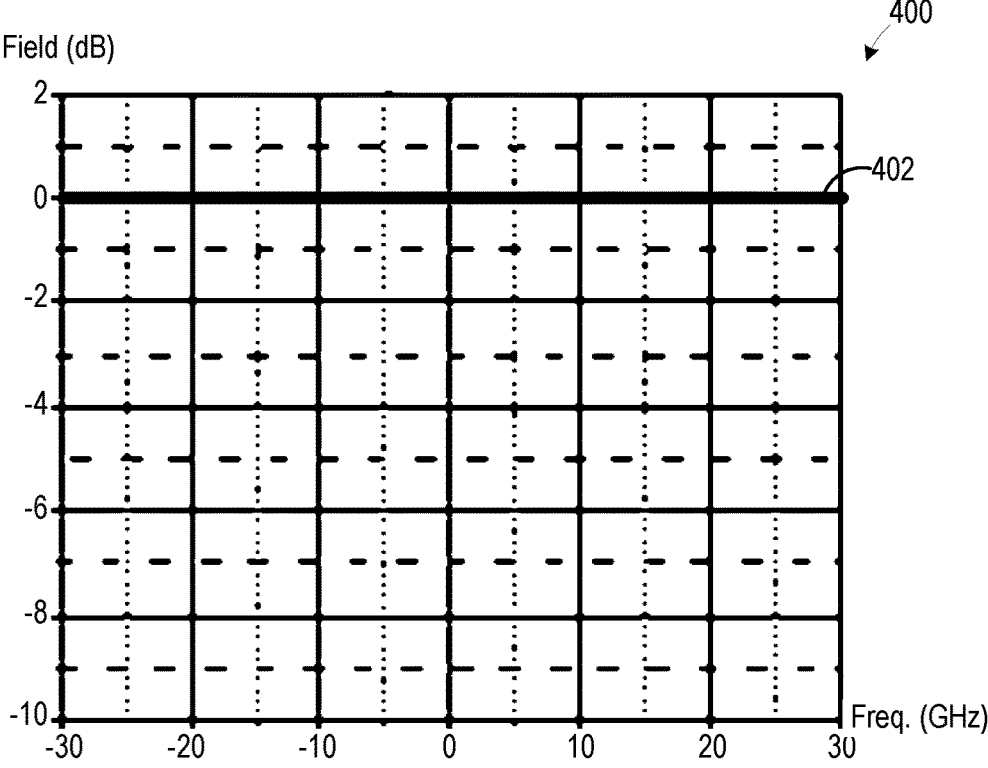
FIG. 4 is a graph of optical field amplitude of a signal in the simulated optical communication network after transmission through the network.
Figure 5:
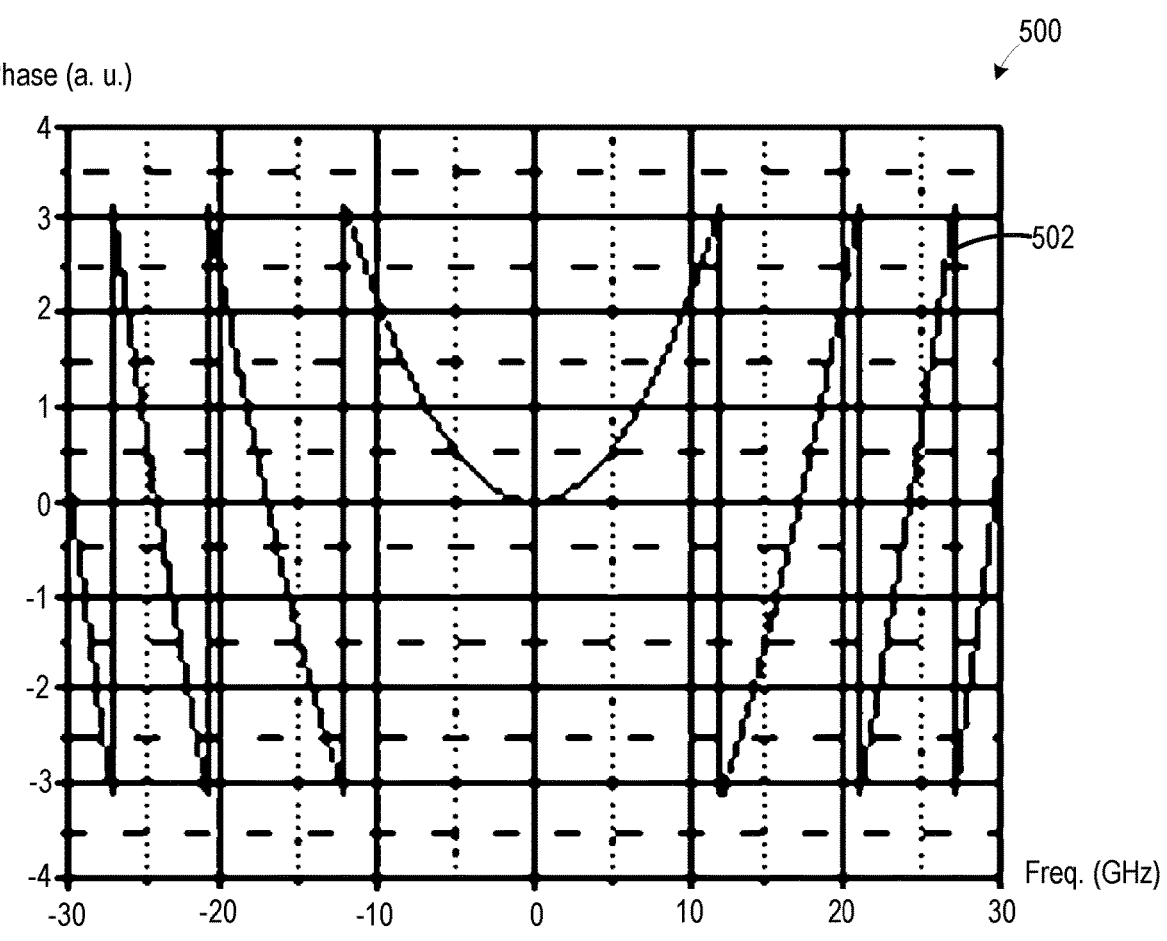
FIG. 5 is a graph of optical field phase of a signal in the simulated optical communication network after transmission through the network.

FIG. 4 is a graph 400 of optical field amplitude, and FIG. 5 is a graph 500 of optical field phase in arbitrary units (a.u.), of a signal in the simulated optical communication network after transmission through the network. A curve 402 of FIG. 4 illustrates that the amplitude is flat, i.e., that the amplitude of the transmitted signal does not materially vary with frequency. A curve 502 of FIG. 5, in contrast, illustrates that phase of the transmitted signal varies significantly with frequency, due to chromatic dispersion in the optical cable. Accordingly, chromatic dispersion causes the optical cable to behave like an all-pass filter, which does not directly affect signal amplitude but significantly affects signal phase, as illustrated in FIGS. 4 and 5. While the distortion in phase caused by chromatic distortion does not directly affect signal amplitude, the distortion in phase affects signal power, as illustrated in FIG. 2.

Effects of chromatic dispersion on a transmitted signal may make it difficult, or even essentially impossible, to recover information, such as a payload, from the signal. Single-side band (SSB) modulation may be used to mitigate effects of chromatic dispersion, and use of SSB modulation may therefore extend maximum transmission distance of an optical communication network. Nevertheless, SSB modulation does not eliminate power fading caused by chromatic dispersion, and SSB modulation leads to signal-to-signal beating interference (SSBI), which degrades signal quality. Additionally, SSB modulation reduces receiving sensitivity from loss of power associated with eliminating one side band. Chromatic dispersion can also be mitigated by pre-compensation at a transmitter-side IQ-modulator, but this pre-compensation scheme induces high insertion loss and requires complex and costly bias control.

Disclosed herein systems and methods for chromatic dispersion pre-compensation (CDPC) which at least partially overcome drawbacks of conventional techniques for mitigating chromatic dispersion. Certain embodiments include a phase modulator (PM) and a cascaded directly-modulated laser (DML), or a coherent optical injection locking (COIL) laser, to realize full-field light modulation. The new systems and methods achieve chromatic pre-compensation by a combination of intensity and phase modulations, thereby potentially significantly extending maximum communication system transmission distance, while achieving significant advantages. For example, use of a phase modulator to achieve phase modulation, instead of an IQ-modulator, relaxes bias control requirements and reduces insertion losses. Additionally, a low-cost, intensity-modulated distributed feedback (DFB) laser can be used as a light source in the new systems. Accordingly, the new systems and methods may be more economical and more efficient than conventional systems and methods. Additionally, the new systems and methods are compatible with optical injection locking subsystems. Moreover, the new systems and methods may extend usable transmission light wavelengths when used in passive optical network (PON) applications. Specifically, a PON is typically configured such that uplink transmission light wavelength is limited to the O band (1260-1360 nm), to avoid chromatic dispersion penalties. Use of the new systems and methods in a PON, however, may sufficiently mitigate chromatic dispersion such that additional bands, such as the C band, can be used, thereby significantly expanding PON capacity and/or flexibility.

Figure 6:
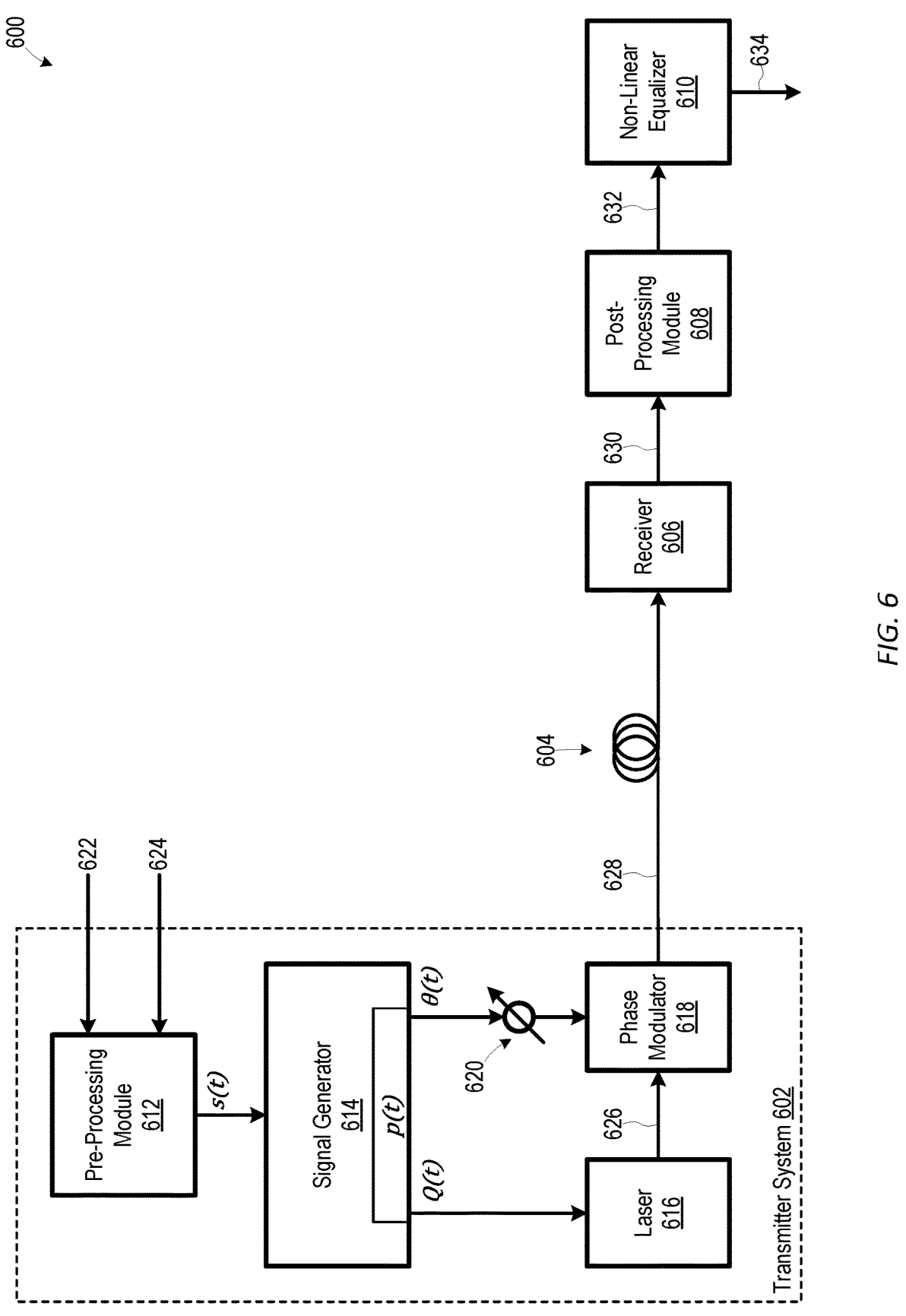
FIG. 6 is a block diagram of an optical communication network including a transmitter system configured to implement chromatic dispersion pre-compensation, according to an embodiment.

FIG. 6 is a block diagram of an optical communication network 600 including a transmitter system 602 configured to implement chromatic dispersion pre-compensation, as well as an optical cable 604, a receiver 606, a post-processing module 608, and an optional non-linear equalizer 610. Optical cable 604 communicatively couples transmitter system 602 and receiver 606, and post processing module 608 is communicatively coupled to an output of receiver 606. Optical non-linear equalizer 610, when present, is communicatively coupled to an output of post processing module 608. Optical cable 628 could be replaced with a free-space optical transmission system without departing from the scope hereof.

Transmitter system 602 includes a pre-processing module 612, a signal generator 614, a laser 616, a phase modulator 618, and a tunable delay line 620. Although the elements of transmitter system 602 are illustrated as being separate elements, two or more of these elements could be at least partially combined without departing from the scope hereof. For example, in some embodiments, pre-processing module 612 and signal generator 614 are embodied by a common processor executing instructions in the form of software and/or firmware. Additionally, all elements of transmitter system 602 need not be disposed in the same location. For example, pre-processing module 612 and signal generator 614 could be remote from laser 616 and phase modulator 618.

Pre-processing module 612 is configured to modulate a carrier signal 622 by an input signal 624 to be transmitted by optical communication network 600 to generate an original modulated signal s(t). For example, some embodiments of pre-processing module 612 are configured to modulate solely amplitude of carrier signal 622, such as by using a non-return-to-zero (NRZ) modulation format or a PAM4 modulation format. As another example, some embodiments of pre-processing module 612 are configured to modulate both amplitude and phase of carrier signal 622, such as by using a quadrature phase shift keying (QPSK) modulation format or a 16-order quadrature amplitude modulation (16-QAM) modulation format. Signal generator 614 is configured to distort original modulated signal s(t) according to an inverse of a transmission function H of optical communication network 600, to generate a compensated signal p(t), which has an amplitude Q(t) and a phase $\theta(t)$. Transmission function H includes effects of chromatic dispersion by optical cable 604. Therefore, distorting original modulated signal s(t) according to an inverse of transmission function H advantageously at least substantially compensates for the chromatic dispersion, such that a signal received by receiver 606 will be at least substantially free of chromatic dispersion artifacts. Such intentional distortion of original modulated signal s(t) to compensate for chromatic dispersion in optical cable 604 may be referred to a "pre-compensation," since signals are compensated for chromatic dispersion before being transmitted through optical cable 604. In some embodiments, transmission function H may be determined from length and material of optical cable 604, such that transmission function H is static. In some other embodiments, transmission function H is determined in real time, or on a periodic basis, such that transmission function H is dynamic. Several possible embodiments of signal generator 614 are discussed below with respect to FIGS. 7-9.

Signal generator 614 provides amplitude Q(t) of compensated signal p(t) to laser 616, and signal generator 614 provides phase $\theta(t)$ of compensated signal p(t) to phase modulator 618. Laser 616 is configured to generate an optical signal 626 and modulate amplitude of optical signal 626 in response to amplitude Q(t) of compensated signal p(t), such that laser 616 is controlled by amplitude Q(t). Accordingly, optical signal 626, as outputted by laser 616, includes amplitude information, but the optical signal does not include phase information. In some embodiments, laser 616 a directly-modulated laser (DML) or a coherent optical injection locking (COIL) laser.

Phase modulator 618 is located downstream of laser 616 with respect to optical signal 626, and phase modulator 618 is configured to modulate a phase of optical signal 626 in response to a phase $\theta(t)$ of compensated signal p(t), to generate an optical signal 628 for transmission by optical cable 604 to receiver 606. Optical signal 628 includes both amplitude and phase information. It may be necessary for respective clocks of laser 616 and phase modulator 618 to be synchronized, or in other words, for the two clocks to match. Accordingly, some embodiments of transmitter system 602 include tunable delay line 620 configured to synchronize the clock of phase modulator 618 with the clock of laser 616, by adding a delay to phase $\theta(t)$ of compensated signal p(t), before phase modulator 618 modulates phase of optical signal 626 according to phase $\theta(t)$.

Optical cable 604 is configured to transmit optical signal 628 from phase modulator 618 to receiver 606, and receiver 606 is configured to convert optical signal 628 into an electrical signal 630. Post-processing module 608 is configured to recover input signal 624 from electrical signal 630 and thereby generate an output signal 632, such as by performing a demodulation technique appropriate for modulation performed by pre-processing module 612. In the event that there is non-linear distortion on output signal 632, such as caused by pre-compensation performed by transmitter system 602, optional non-linear equalizer 610 may be used to perform non-linear equalization of output signal 632 to generate a corrected output signal 634.

Possible applications of optical communication network 600 including transmitting data over a short distance, a medium distance, or a long distance. For example, optical communication network 600 could be used to transmit data within a data center, within a building, or even within a single networking appliance. As another example, optical communication network 600 could be part of an access network, including but not limited to, a PON. As yet another example, optical communication network 600 could be part of a long distance data transmission network.

Figure 7:
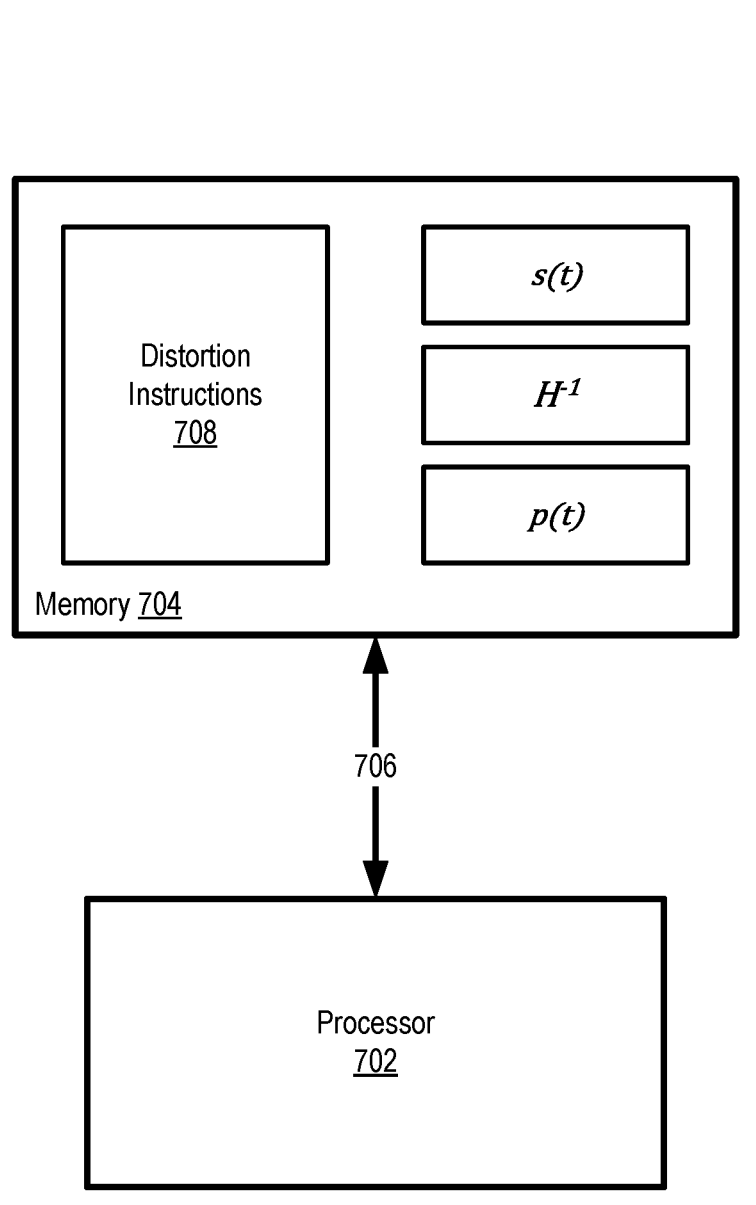
FIG. 7 is a block diagram of one possible embodiment of a signal generator of the FIG. 6 optical communication network.

FIG. 7 is a block diagram of a signal generator 700, which is one possible embodiment of signal generator 614 of FIG. 6, although it is understood that signal generator 614 is not limited to the FIG. 7 embodiment. Signal generator 700 includes a processor 702, a memory 704, and a communication bus 706 communicatively coupling processor 702 and memory 704. Memory 704 includes distortion instructions 708 in the form of software and/or firmware. Memory 704 also holds a copy of each of original modulated signal s(t), an inverse $H^{-1}$ of the network transmission function H. and compensated signal p(t). Processor 702 is configured to execute instructions 708 to generate compensated signal p(t) from original modulated signal s(t) and inverse $H^{-1}$ of the network transmission function H. In some embodiments, instructions 708 are configured such that processor 702 generates compensated signal p(t) according to a method illustrated in FIG. 8 or a method illustrated in FIGS. 9A-9F (discussed below). Processor 702 may be configured to perform additional functions without departing from the scope hereof. For example, in some embodiments, memory 704 includes additional instructions (not shown) for processor 702 to generate original modulated signal s(t), such that signal generator 700 embodies pre-processing module 612 as well as signal generator 614.

Figure 8:
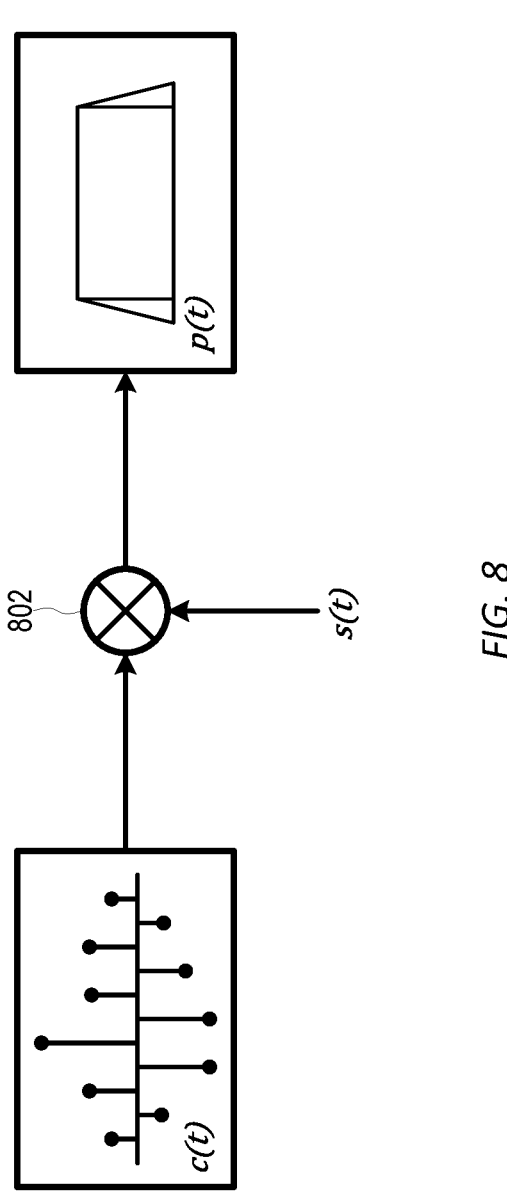
FIG. 8 is a block diagram illustrating a method performed by some embodiments of the signal generator of the FIG. 6 optical communication network for generating a compensated signal.

FIG. 8 is a block diagram 800 illustrating a method performed by some embodiments of signal generator 614 to generate compensated signal p(t). In the method illustrated in FIG. 8, signal generator 614 determines a time domain filter function c(t) by converting the inverse $H^{-1}$ of the network transmission function H from the frequency domain to the time domain, such as by using an inverse fast Fourier transform (ifft) method. Signal generator 614 then convolves 802 original modulated signal s(t) with time domain filter function c(t) to generated compensated signal p(t). The method illustrated in FIG. 8 may be practical to implement in applications where a required number of taps in time domain filter function c(t) is less than 20, which is common in applications where optical cable 604 is relatively short, such as less than or equal to 40 Kilometers (Km). However, the FIG. 8 method may not be practical to implement in applications requiring a larger number of taps, due to large memory requirements and high computation complexity associated with convolution operation 802.

Figures 9A, 9B, 9C, 9D, 9E, 9F:
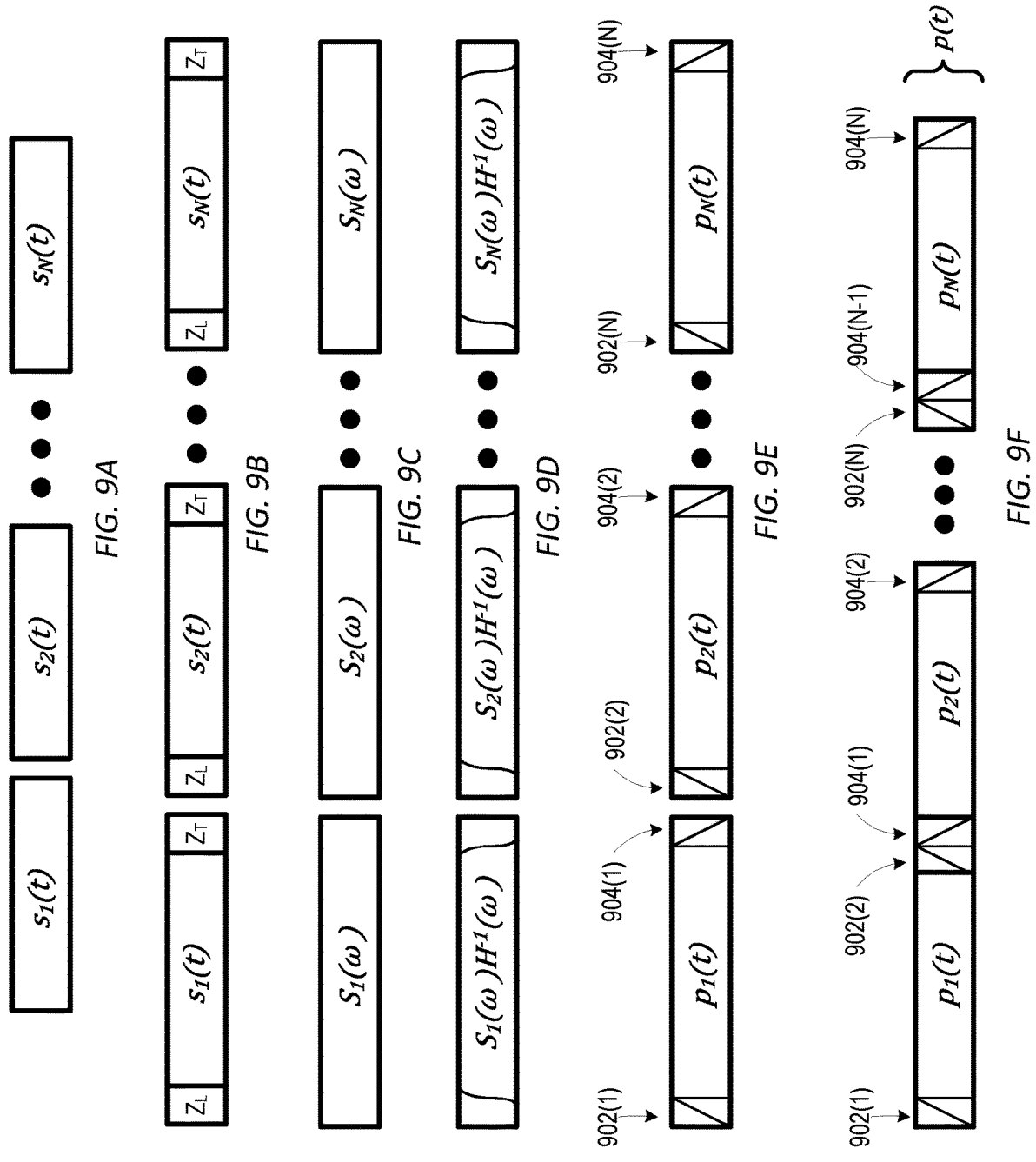
FIGS. 9A-9F are block diagrams collectively illustrating a method performed by some other embodiments of the signal generator of the FIG. 6 optical communication network for generating a compensated signal.

FIGS. 9A-9F are block diagrams collectively illustrating a method performed by some other embodiments of signal generator 614 to generate compensated signal p(t). The method begins with signal generator 614 dividing original modulated signal s(t) into N blocks $s_k(t)$, as illustrated in FIG. 9A, where N is an integer greater than one and k is an index ranging from 1 to N. Signal generator 614 then adds leading zeros $Z_L$ and trailing zeros $Z_T$ to each block $s_k(t)$, as illustrated in FIG. 9B. Signal generator 614 next converts each block $s_k(t)$ from a time domain to a frequency domain, such as by using a fast Fourier transform (FFT) technique, to generate frequency domain blocks $S_k(\omega)$, as illustrated in FIG. 9C. Signal generator 614 subsequently multiplies each frequency domain block $S_k(\omega)$ by the inverse $H^{-1}(\omega)$ of the network transmission function H to obtain frequency domain filtered blocks $S_k(\omega)H^{-1}(\omega)$, as illustrated in FIG. 9D. Each frequency domain filtered block $S_k(\omega)H^{-1}(\omega)$ is subsequently converted to the time domain by signal generator 614 to yield time domain filtered blocks $p_k(t)$, as illustrated in FIG. 9E, such as by using an inverse fast Fourier transform technique.

Each time domain filtered blocks $p_k(t)$ includes a respective damping tail at the beginning and end of the block, caused by pulse expansion from the chromatic dispersion pre-compensation process. The leading and trailing zeros discussed above help mitigate effects of the damping tails, such that each damping tail is at least substantially encompassed by leading zeros or trailing zeros. Time domain filtered blocks $p_k(t)$ are labeled in FIG. 9E to show portions 902 associated with leading zeros and portions 904 associated with trailing zeros. In this document, specific instances of an item may be referred to by use of a numeral in parentheses (e.g. portion 902(1)) while numerals without parentheses refer to any such item (e.g. portions 902). Signal generator 614 subsequently partially overlaps and sums time domain filtered blocks $p_k(t)$ to obtain compensated signal p(t), as illustrated in FIG. 9F. Signal generator 614 overlaps time domain filtered blocks $p_k(t)$ such that for each pair of immediately adjacent time domain filtered blocks $p_k(t)$, a portion 904 of a first block of the pair associated with trailing zeros overlaps a portion 902 of a second block of the pair associated with leading zeros. For example, in pair of immediately adjacent time domain filtered blocks $p_1(t)$ and $p_2(t)$, portion of 904(1) of block $p_1(t)$ associated with trailing zeros overlaps a portion of block $p_2(t)$, and a portion 902(2) of block $p_2(t)$ associated with leading zeros overlaps a portion of block $p_1(t)$.

The method illustrated in FIGS. 9A-9F may be more computationally efficient than the method illustrated in FIG. 8, and the method of FIGS. 9A-9F may therefore be particularly suitable for embodiments of communication network 600 where length of optical cable 604 is relatively long, such as greater than 40 Km. However, the method of FIGS. 9A-9F is more susceptible to data frame desynchronization than the FIG. 8 method, due to the block-wise signal processing techniques used in the FIGS. 9A-9F method.

Figure 10:
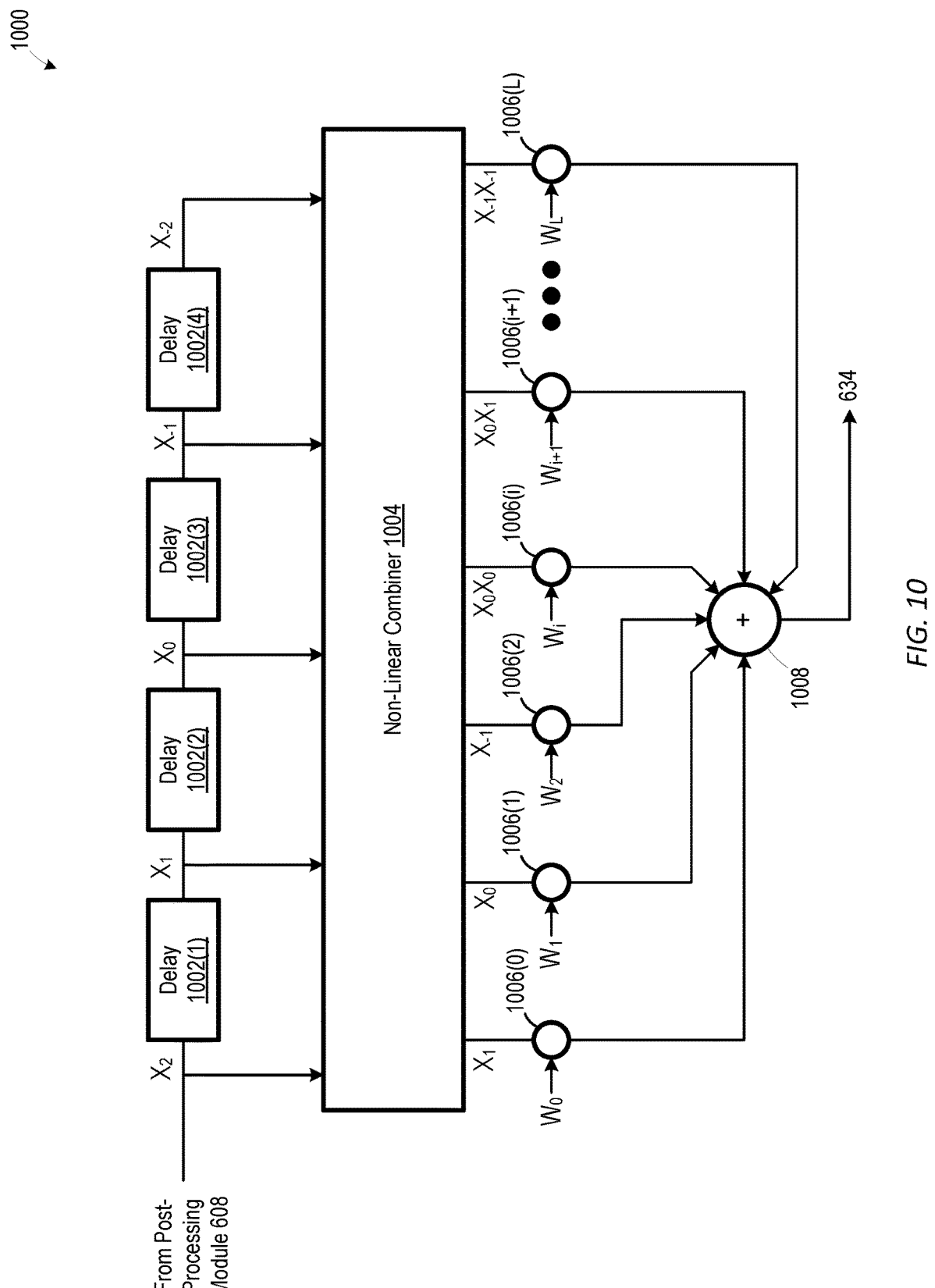
FIG. 10 is a block diagram of one possible embodiment of a non-linear equalizer of the FIG. 6 optical communication network.

FIG. 10 is a block diagram of a non-linear equalizer 1000, which is one possible embodiment of non-linear equalizer 610 of FIG. 6. Non-linear equalizer 1000 has a Volterra non-linear equalizer architecture and includes a plurality of delay taps 1002, a nonlinear combiner 1004, a plurality of tap weight modules 1006, and an addition module 1008. Tap weight modules 1006 are optionally adjusted to minimize a mean-square error between transmitted symbols and received symbols after digital filtering. In some embodiments, the elements of non-linear equalizer 1000 are embodied by a processor (not shown) executing instructions in the form of software and/or firmware stored in a memory (not shown).

Example Simulation Results

Figure 11:
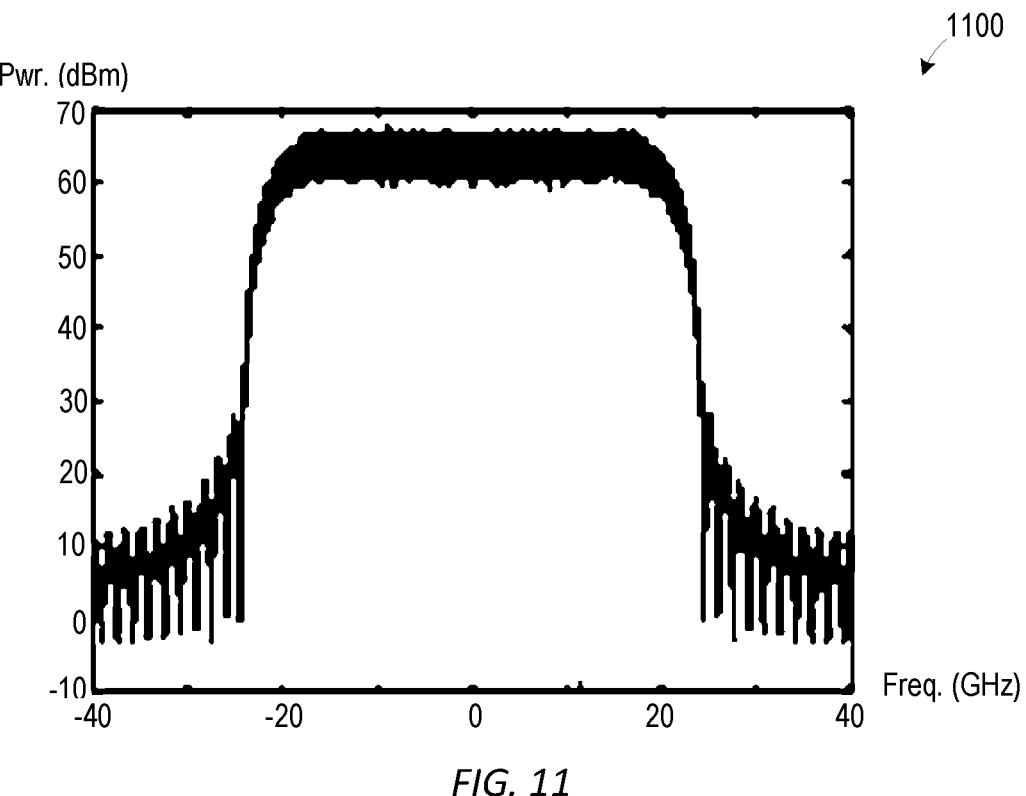
FIG. 11 is a graph of simulated signal power magnitude versus frequency of an original modulated signal of an embodiment of the FIG. 6 communication network.
Figure 12:
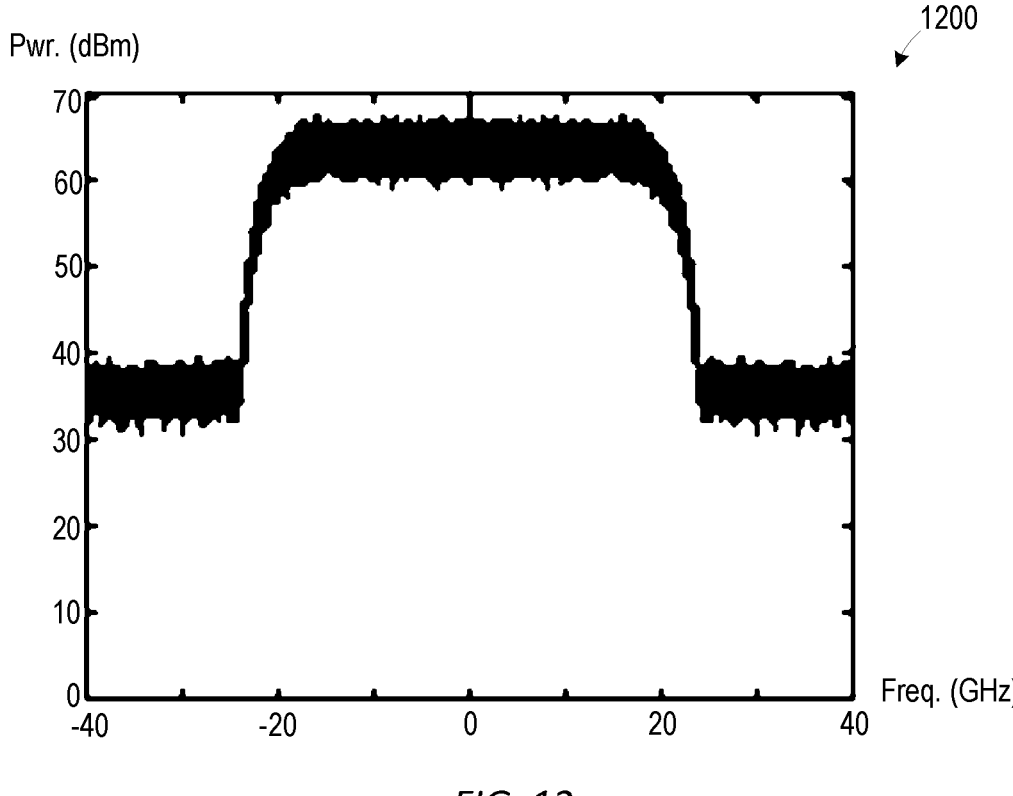
FIG. 12 is a graph of simulated signal power magnitude versus frequency of an output electrical signal of an embodiment of the FIG. 6 communication network.

Discussed below with respect to FIGS. 11-13 are simulation results of several embodiments of communication network 600. It is appreciated, though, that communication network 600 need not necessarily perform as indicated in these simulation results. To the contrary, performance of communication network 600 will vary depending on the specific configuration and operating conditions of the communication network.

FIG. 11 is a graph 1100 of simulated signal power magnitude versus frequency of original modulated signal s(t), and FIG. 12 is a graph 1200 of simulated signal power magnitude versus frequency of output electrical signal 630 from receiver 606. In these simulations, pre-processing module 612 is configured to modulate carrier signal 622 at a rate of 40 Giga Baud (GBaud) per second, optical cable 604 is a five Kilometer long single-mode fiber optical cable, and (c) signal generator 614 is configured to implement the method illustrated in FIGS. 9A-9F. It should be appreciated that the response of FIG. 12 has a similar shape to that of FIG. 11, thereby showing that this embodiment of communication network 600 compensates for chromatic distortion. The performance of communication network 600 can be further appreciated by comparing FIG. 12 to FIG. 2, where the response of FIG. 12 does not include the notches from chromatic dispersion that are present in the FIG. 2 response.

FIG. 13 is a graph 1300 of simulated bit error rate (BER) versus optical signal to noise ratio (OSNR) of two communication networks. The first communication network, corresponding to the curve labeled "w/CDPC", is an embodiment of communication network 600 where (a) pre-processing module 612 is configured to modulate carrier signal 622 at a rate of 40 GBaud per second using PAM4 and (b) optical cable 604 is five Kilometer long single-mode fiber optical cable. The second communication network, corresponding to the curve labeled "w/o CDPC" is like the embodiment of communication 600 described immediately above but with without CDPC capability. FIG. 13 also includes lines respectively representing BER thresholds of 2E-2 and 4.5E-3. It can be determined from FIG. 13 that a OSNR penalty is improved by 1 dB and 1.5 dB, respectively, by the CDPC capabilities of communication network 600.

Further Examples

Discussed below with respect to FIG. 14 are additional examples of operation of communication network 600. It is appreciated however, that communication network 600 is not limited to operating according to these examples.

FIG. 14 is a flow chart of a method 1400 for chromatic dispersion pre-compensation in an optical communication network. In a block 1402 of method 1400, an original modulated signal is distorted according to an inverse of a transmission function of the optical communication network to generate a compensated signal. In one example block 1402, signal generator 614 distorts original modulated signal s(t) according to an inverse of transmission function H to generated compensated signal p(t). In a block 1404 of method 1400, a magnitude of an optical signal is modulated using an intensity modulator, in response to magnitude of the compensated signal. In one example of block 1404, laser 616 modulates a magnitude of optical signal 626 in response to a magnitude Q(t) of compensated signal p(t). In a block 1406 of method 1400, a phase of the optical signal is modulated using a phase modulator, in response to a phase of the compensated signal, after modulating magnitude of the optical signal. In one example of block 1406, phase modulator 618 modulates phase of optical signal 628 in response to phase θ(t) of compensated signal p(t).

Phase Correction

Coherent optical communication technology, which includes modulating amplitude, phase, and polarization of an optical carrier signal, is a versatile technology which is widely considered as the most future-proof technology for optical access networks. Advancements in digital signal processing (DSP) techniques have expanded use of coherent optical technology by enabling advanced signal formats (e.g., QPSK. 8-QAM, 16-QAM, etc.) which support polarization multiplexing. These signal formats, which were initially used in long-haul communication links, have recently expanded to use in metro networks, thereby greatly improving metro network transmission data rate and spectrum efficiency.

Additionally, PONs are evolving towards 100 Gigabit per second data transmission rates. However, conventional PON direct detection schemes face huge challenges to support such high transmission rates because of low receiver sensitivity and limited power budget. Coherent optical communication technology can help meet this challenge, for example, by (1) improving link power budget via much higher sensitivity and (2) enabling high-order modulation formats to increase data transmission rate and network efficiency.

Figure 15:
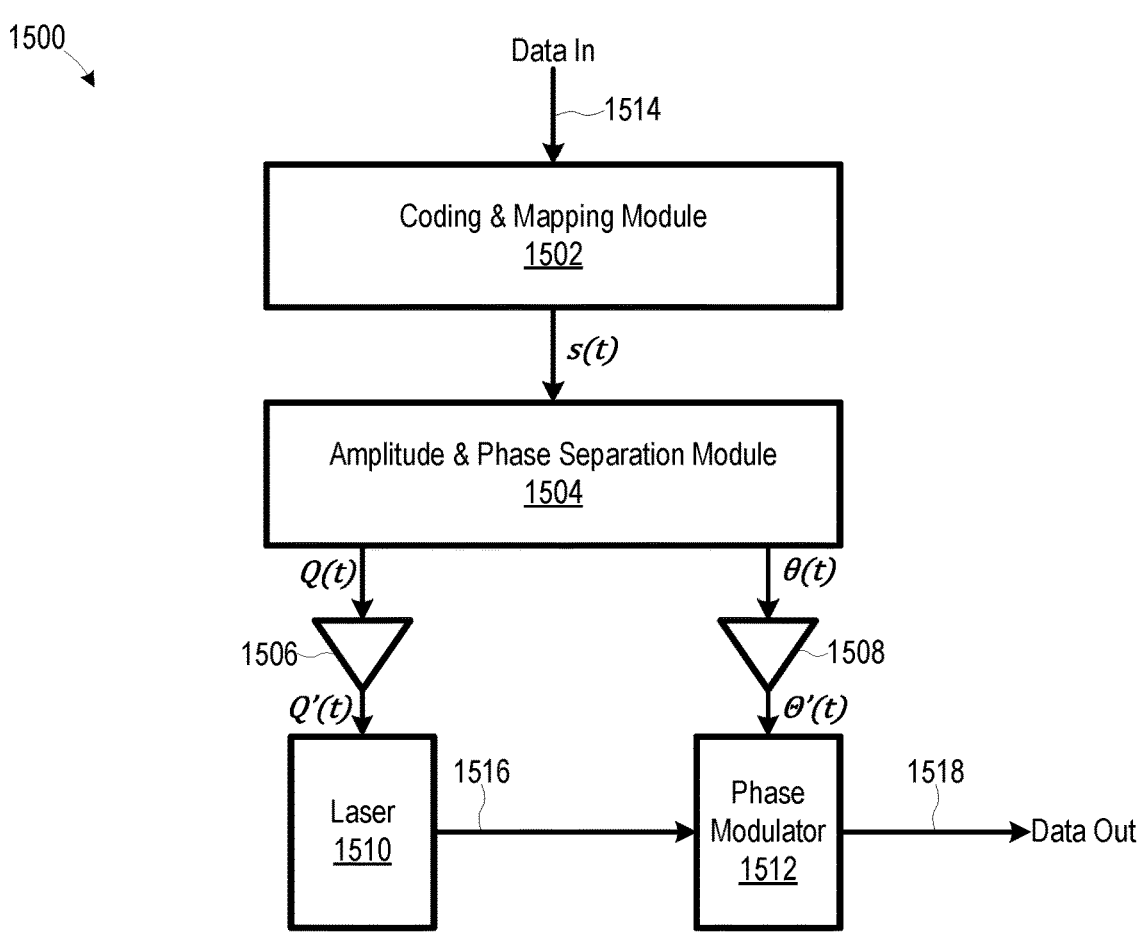
FIG. 15 is a block diagram of a transmitter system.

However, one challenge in implementing coherent optical communication technology is addressing phase rotation. Phase rotation is a phenomenon where an optical signal has a phase that variers with output signal amplitude, instead of having a flat phase response. Phase rotation is caused, for example, by non-idealities of a transmission system laser, such as laser chirp and/or laser diode carrier density changes. Phase rotation may also result from other phenomena in a communication network, such as chromatic dispersion. To help understand this phase rotation, consider FIG. 15, which is a block diagram of a transmitter system 1500 including a coding and mapping module 1502, and amplitude and phase separation module 1504, a driver 1506, a driver 1508, a laser 1510, and a phase modulator 1512. Coding and mapping module 1502 is configured to modulate a carrier signal according to an electrical input signal 1514 to generate a modulated signal s(t), where information of input electrical signal 1514 is coded and mapped to desired constellations in modulated signal s(t). In some embodiments, coding and mapping module 1502 is configured to use a modulation scheme such as QPSK. 8-QAM, 16-QAM, etc., to generate modulated signal s(t).

Modulated signal s(t) is a complex signal, and amplitude and phase separation module 1504 is configured to separate modulated signal s(t) into an amplitude signal Q(t) and a phase signal θ(t). Driver 1506 is configured to amplify amplitude signal Q(t) to yield amplitude signal Q'(t), and driver 1508 is configured to amplify phase signal θ(t) to yield phase signal θ'(t). Laser 1510 is configured to generate an optical signal 1516 and modulate amplitude of optical signal 1516 in response to amplitude signal Q'(t), such that laser 1510 is controlled by amplitude signal Q'(t). Accordingly, optical signal 1516, as outputted by laser 1510, includes amplitude information, but the optical signal does not include phase information.

Phase modulator 1512 is located downstream of laser 1510 with respect to optical signal 1516, and phase modulator 1512 is configured to modulate a phase of optical signal 1516 in response to phase signal θ'(t), to generate an optical signal 1518 for transmission to a receiver (not shown). Optical signal 1518 is transmitted to a receiver, for example, by an optical cable and/or by free space optics. Optical signal 1518 includes both amplitude and phase information of modulation signal s(t).

Laser 1510 should ideally have a flat phase response, i.e., phase of optical signal 1516 should not vary as a function of amplitude of optical signal 1516. However, phase rotation of laser 1510 causes phase of optical signal 1516 to vary as a function of amplitude modulation of optical signal 1516. Specifically, phase θ of optical signal 1516 may be represented by EQN. 1 below, where N is a normalized carrier number related to magnitude of amplitude signal Q'(t) driving laser 1510.

$$\theta \propto \sin^{-1}{}^2\sqrt{N} \qquad \text{(EQN. 1)}$$

Figure 16:
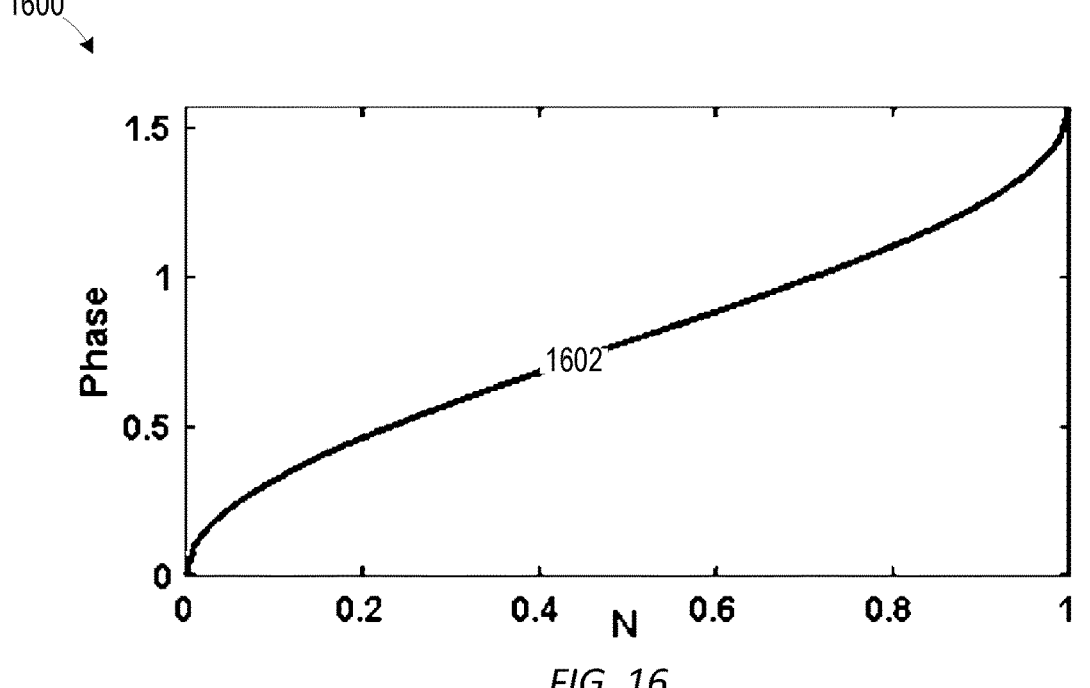
FIG. 16 is a graph of simulated phase versus carrier number of one embodiment of a laser of the FIG. 15 transmitter system.

As evident from EQN. 1, phase of optical signal 1516 varies as a function of modulation level of the optical signal. FIG. 16 is a graph of simulated phase versus carrier number for one embodiment of laser 1510, where curve 1602 is phase of optical signal 1516 as a function of normalized carrier number N. As evident from FIG. 16, laser 1510 does not have a flat phase response; instead, phase of optical signal 1516 varies significantly with normalized carrier number N.

Figure 17:
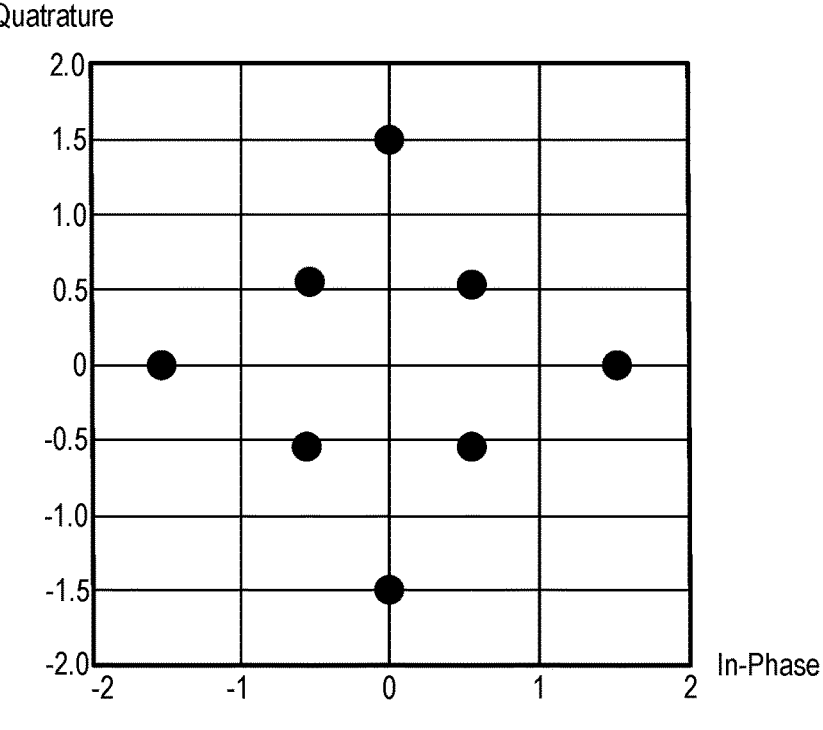
FIG. 17 is a scatter plot of target constellation mapping of an embodiment of the FIG. 15 transmitter system implementing 8-QAM modulation.
Figure 18:
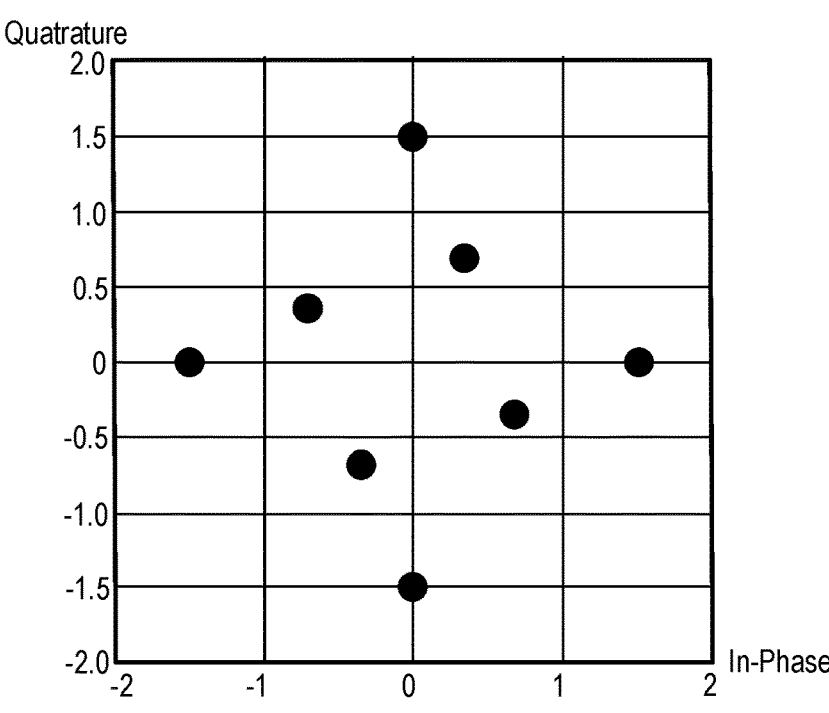
FIG. 18 is a scatter plot of actual constellation mapping of the transmitter system considered in FIG. 17, showing effects of phase rotation.

FIGS. 17-20 illustrate effects of phase rotation on signal constellation mapping. FIG. 17 is a scatter plot 1700 of a target (ideal) constellation mapping of an embodiment of transmitter system 1500 where coding and mapping module 1502 implements 8-QAM modulation. FIG. 18 is scatter plot 1800 of actual constellation mapping of the same transmitter system considered in FIG. 17. Comparison of FIGS. 17 and 18 shows that phase rotation causes actual constellation mapping to be significantly different than target constellation mapping. Similarly, FIG. 19 is a scatter plot 1900 of target (ideal) constellation mapping of an embodiment of transmitter system 1500 where coding and mapping module 1502 implements 16-QAM modulation. FIG. 20 is scatter plot 2000 of actual constellation mapping of the same transmitter system considered in FIG. 19. Comparison of FIGS. 19 and 20 shows that phase rotation causes actual constellation mapping to be significantly different than target constellation mapping. Non-ideal constellation mapping will cause receiver demodulation errors, and laser 1510 phase rotation is therefore undesirable.

Disclosed herein are systems and methods for phase compensation which at least partially mitigate the effects of phase rotation discussed above. Certain embodiments are configured to modify a modulated signal to compensate for phase rotation of a laser, such that an amplitude modulated output signal of the laser has minimal phase rotation, or even essentially no phase rotation. The modulated signal is modified, for example, by adding to the modulated signal a phase value that is opposite a phase rotation value exhibited by the laser, or by subtracting from the modulated signal the phase rotation value exhibited by the laser, such that the laser output signal has little or no phase rotation. Additionally, some embodiments are configured to modify a modulated signal to compensate for phase rotation caused by one or more communication network elements other than, or in addition to, a laser. Required phase compensation can be determined either off-line or on-line.

Figure 21:
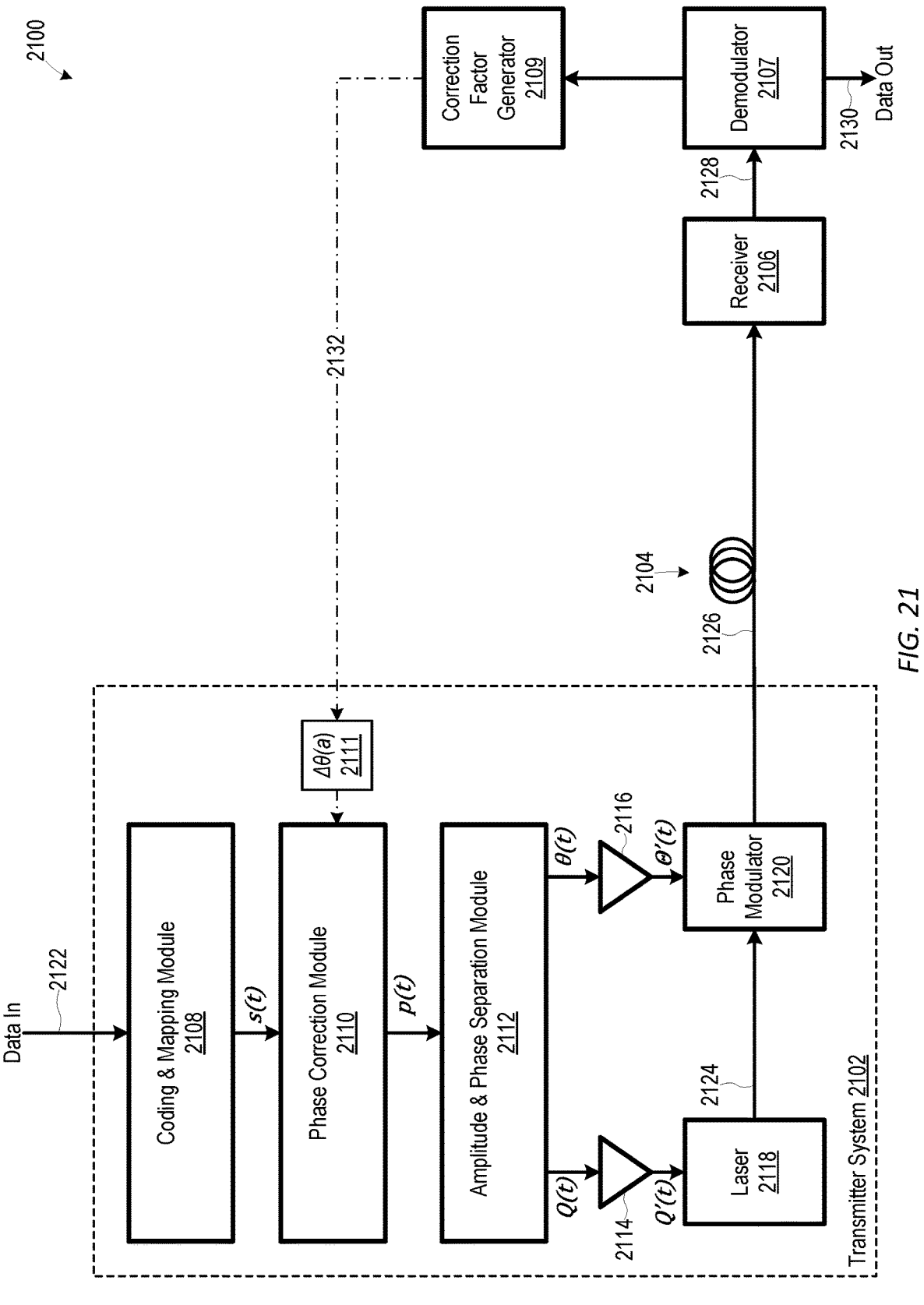
FIG. 21 is a block diagram of an optical communication network including a transmitter system configured to implement phase compensation, according to an embodiment.

FIG. 21 is a block diagram of an optical communication network 2100 configured to implement phase compensation. Optical communication network includes a transmitter system 2102, an optical cable 2104, a receiver 2106, a demodulator 2107, and an optional correction factor generator 2109. Optical cable 2104 communicatively couples transmitter system 2102 and receiver 2106, although optical cable 2104 could be replaced with, or supplemented by, a free-space optical transmission system. Transmitter subsystem 2102 includes a coding and mapping module 2108, a phase correction module 2110, an amplitude and phase separation module 2112, a driver 2114, a driver 2116, a laser 2118, and a phase modulator 2120. Coding and mapping module 2108, phase correction module 2110, and amplitude and phase separation module 2112, are formed, for example, of analog electrical circuitry and/or digital electronic circuitry. Additionally, some embodiments of these modules are at least partially implemented by a processor (not shown) executed instructions (not shown) stored in a memory, to perform the functions of these modules. Although coding and mapping module 2108, phase correction module 2110, and amplitude and phase separation module 2112 are depicted as being separate elements, two or more of these modules could be partially or fully combined.

Figure 22:
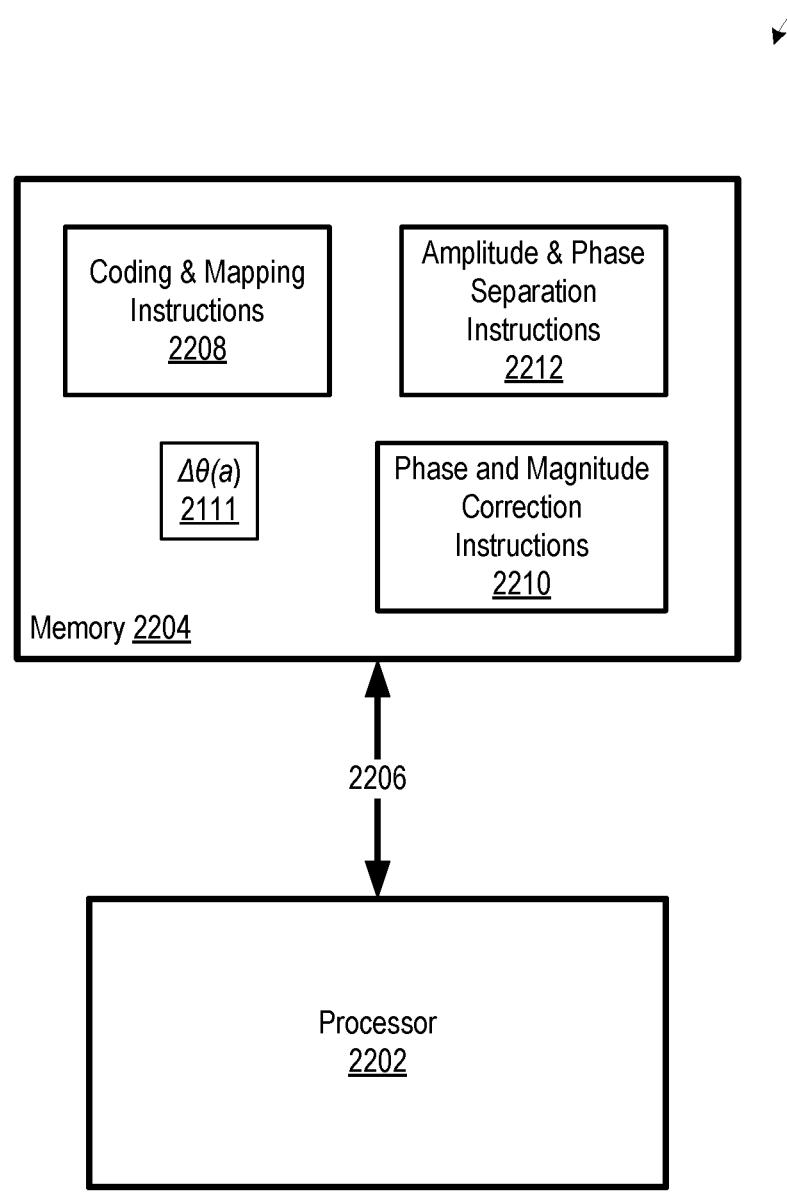
FIG. 22 is a block diagram of a transmitter signal processing module, according to an embodiment.

FIG. 22 is a block diagram of a transmitter signal processing module 2200, which is one possible embodiment coding and mapping module 2108, phase correction module 2110, and amplitude and phase separation module 2112, where all three of these modules are at least partially implemented by a common processor executing instructions stored in a memory. It is understood, however, that modules 2108, 2110, and 2112 of transmitter system 2102 are not limited to the FIG. 22 embodiment. For example, each of modules 2108, 2110, and 2112 could instead be implemented by respective hardware, instead of by shared hardware. Transmitter signal processing module 2200 includes a processor 2202, a memory 2204, and a communication bus 2206 communicatively coupling processor 2202 and memory 2204. Memory 2204 includes coding and mapping instructions 2208, phase and magnitude correction instructions 2210, and amplitude and phase separation instructions 2212, each in the form of software and/or firmware. Memory 2204 optionally also holds a copy of a table 2111 of corrections factors, discussed below. Processor 2202 is configured to execute instructions 2208 to perform the functions of coding and mapping module 2108, and processor 2202 is configured to execute instructions 2212 to perform the functions of amplitude and phase separation module 2112. Additionally, processor 2202 is configured to execute instructions 2212, optionally in conjunction with the correction factors of table 2111, to perform the functions of phase correction module 2110.

Referring again to FIG. 21, coding and mapping module 2108 is configured to modulate a carrier signal according to an electrical input signal 2122 to generate a modulated signal s(t), where information of input electrical signal 2122 is coded and mapped to desired constellations in modulated signal s(t). In some embodiments, coding and mapping module 2108 is configured to use a modulation scheme such as QPSK, 8-QAM, 16-QAM, etc., to generate modulated signal s(t).

Phase correction module 2110 is configured to modify phase of modulated signal s(1) by a correction factor $\Delta\theta(a)$, e.g., add $\Delta\theta(a)$ to the phase of modulated signal s(1) or subtract $\Delta\theta(a)$ from the phase of modulated signal s(t), to generate compensated signal p(t), where a is amplitude of an optical signal 2124 generated by laser 2118. Phase correction module 2110 may have access to table 2111 of respective correction factors $\Delta\theta$ for each amplitude a of optical signal 2124. Each correction factors $\Delta\theta$ is, for example, an opposite of phase rotation exhibited by laser 2118 (and/or another element of optical communication network 2100) at the respective optical signal amplitude a of the correction factor. For example, assume that laser 2118 exhibits a phase rotation of x and y at normalized optical signal amplitudes of 1 and 2, respectively. $\Delta\theta$ for normalized optical signal amplitudes 1 and 2 may be approximately −x and −y, respectively, to compensate for phase rotation of laser 2118 at these normalized amplitudes. As discussed below, correction factors $\Delta\theta$ may be determined either off-line or on-line.

Compensated signal p(t) is a complex signal, and amplitude and phase separation module 2112 is configured to separate compensated signal p(t) into an amplitude signal Q(t) and a phase signal $\theta$(t). Driver 2114 is configured to amplify amplitude signal Q(t) to yield amplitude signal Q'(t), and driver 2116 is configured to amplify phase signal $\theta$(t) to yield phase signal $\theta$'(t). Laser 2118 is configured to generate an optical signal 2124 and modulate amplitude of optical signal 2124 in response to amplitude signal Q'(t), such that laser 2118 is controlled by amplitude signal Q'(t). Accordingly, optical signal 2124, as outputted by laser 2118, includes amplitude information, but the optical signal does not include phase information. Additionally, in contrast to optical signal 1516 generated by laser 1510 of FIG. 15, optical signal 2124 advantageously does not exhibit significant phase rotation, due to modification of modulated signal s(t) by phase correction module 2110.

Phase modulator 2120 is located downstream of laser 2118 with respect to optical signal 2114, and phase modulator 2120 is configured to modulate a phase of optical signal 2124 in response to phase signal $\theta$'(t), to generate an optical signal 2126 for transmission to receiver 2106 by optical cable 2104. In an alternate embodiment, optical signal 2126 is transmitted from transmitter system 2102 to receiver 2106 at least partially by free space optics (not shown). Receiver 2106 is configured to generate electrical output signal 2128 in response to optical signal 2126. Receiver 2106 is, for example, a coherent receiver. Demodulator 2107 is configured to recover input signal 2122 from electrical signal 2128 and thereby generate an output signal 2130, such as by performing a demodulation technique appropriate for modulation performed by coding and mapping module 2108.

Figure 23:
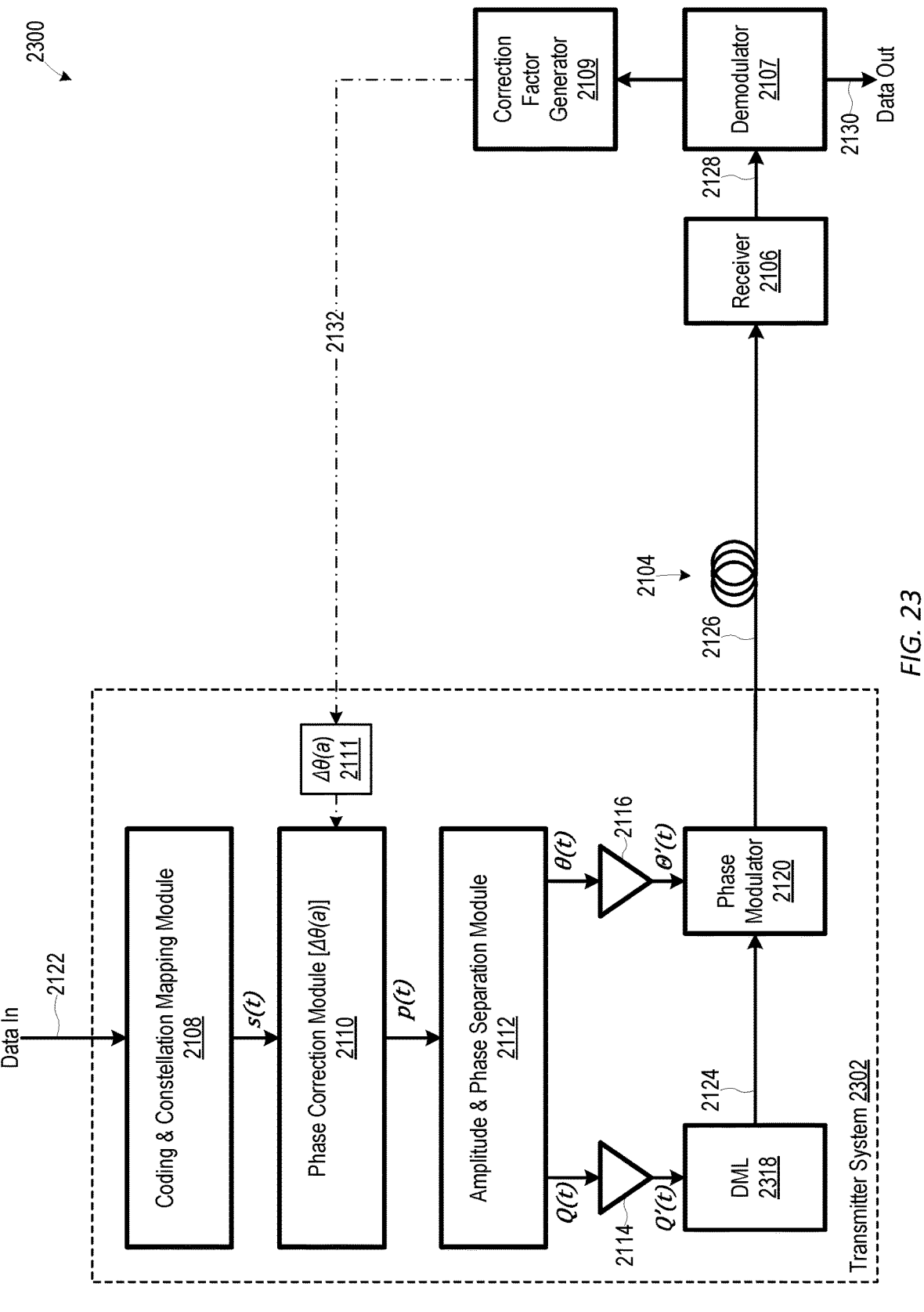
FIG. 23 is a block diagram of an embodiment of the FIG. 21 optical communication network including a directly-modulated laser.
Figure 24:
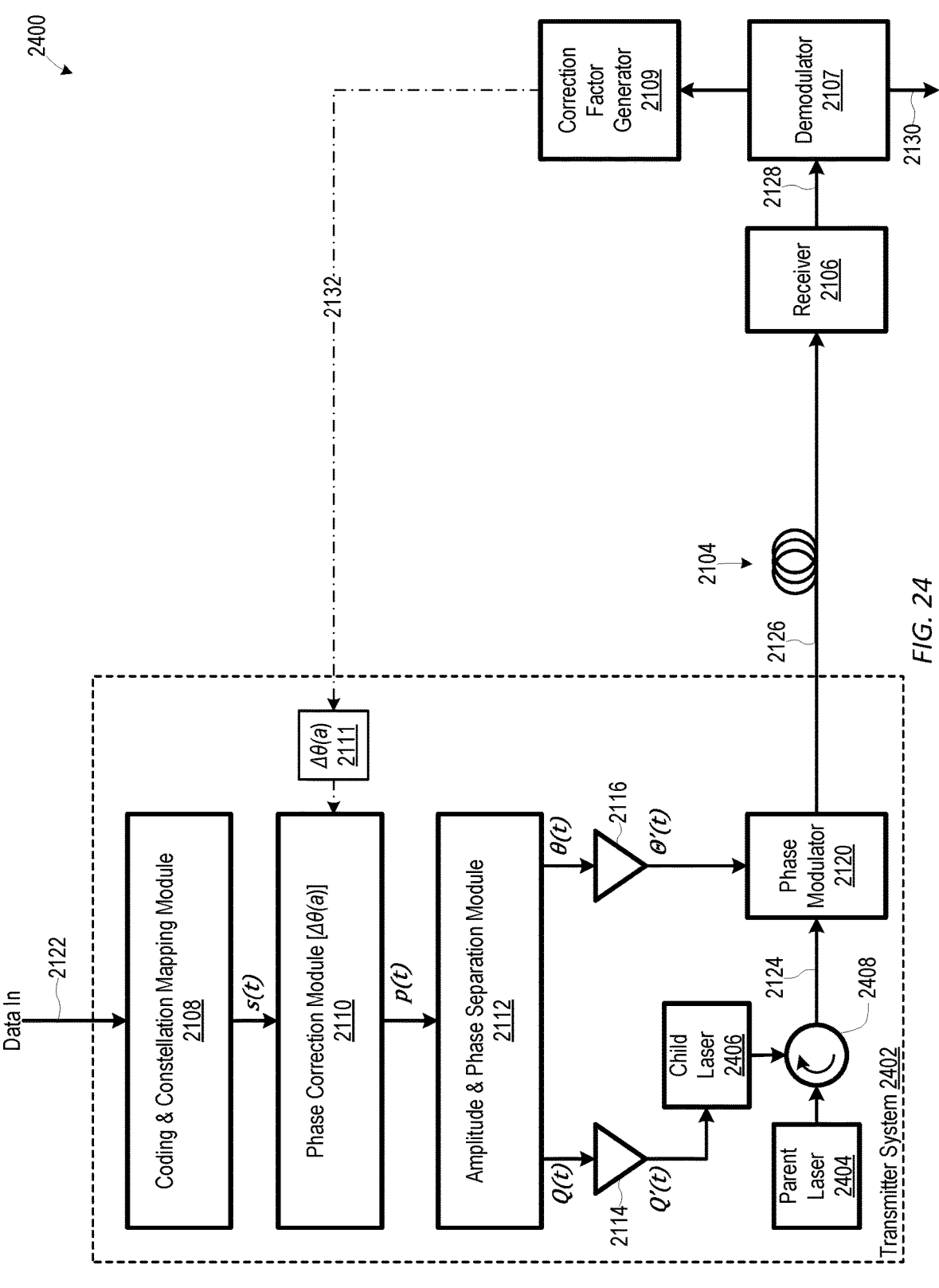
FIG. 24 is a block diagram of an embodiment of the FIG. 21 optical communication network including a coherent optical injection locking laser.

Laser 2118 is, for example, a directly-modulated laser (DML) or a coherent optical injection locking (COIL) laser. For example, FIG. 23 is a block diagram of an optical communication network 2300, which is an embodiment of network 2100 of FIG. 21 where transmitter subsystem 2102 is embodied by transmitter subsystem 2302 including a DML 2318. As another example, FIG. 24 is a block diagram of an optical communication network 2400, which is an embodiment of network 2100 of FIG. 21 where transmitter subsystem 2102 is embodied by transmitter subsystem 2402. A COIL laser is implemented in transmitter subsystem 2402 by a parent laser 2404, a child laser 2406, and circulator 2408.

Referring again to FIG. 21, in some embodiments, correction factors $\Delta\theta$ are determined by measuring phase rotation of laser 2118 at each possible amplitude a of optical signal 2124 and designating an opposite of each measured phase rotation as the correction factor for the amplitude a value. One possible method of determining phase rotation of laser 2102 is to supply a training sequence of amplitude values to laser 2118 and determine phase values of output signal 2130 at different amplitudes of optical signal 2124 when phase modulator 2120 is inactive, i.e., when phase modulator 2120 does not change phase of optical signal 2124. Such determined phase values are equivalent to the phase rotation of laser 2118 because phase modulator 2120 is inactive.

Correction factors Δθ may be determined off-line, i.e., before transmitter system 2102 is installed in a communication network, such as during calibration of transmitter system 2102. In such case, receiver 2106, demodulator 2107, and correction factor generator 2109 may be elements of a calibration apparatus, instead of being elements of a communication network where transmitter system 2102 will ultimately be installed. Alternately, correction factors Δθ may be determined on-line, i.e., after transmitter system 2102 has been installed in a communication network, and in such applications, the communication network may include correction factor generator 2109 to help determine correction factors Δθ.

Figure 25:
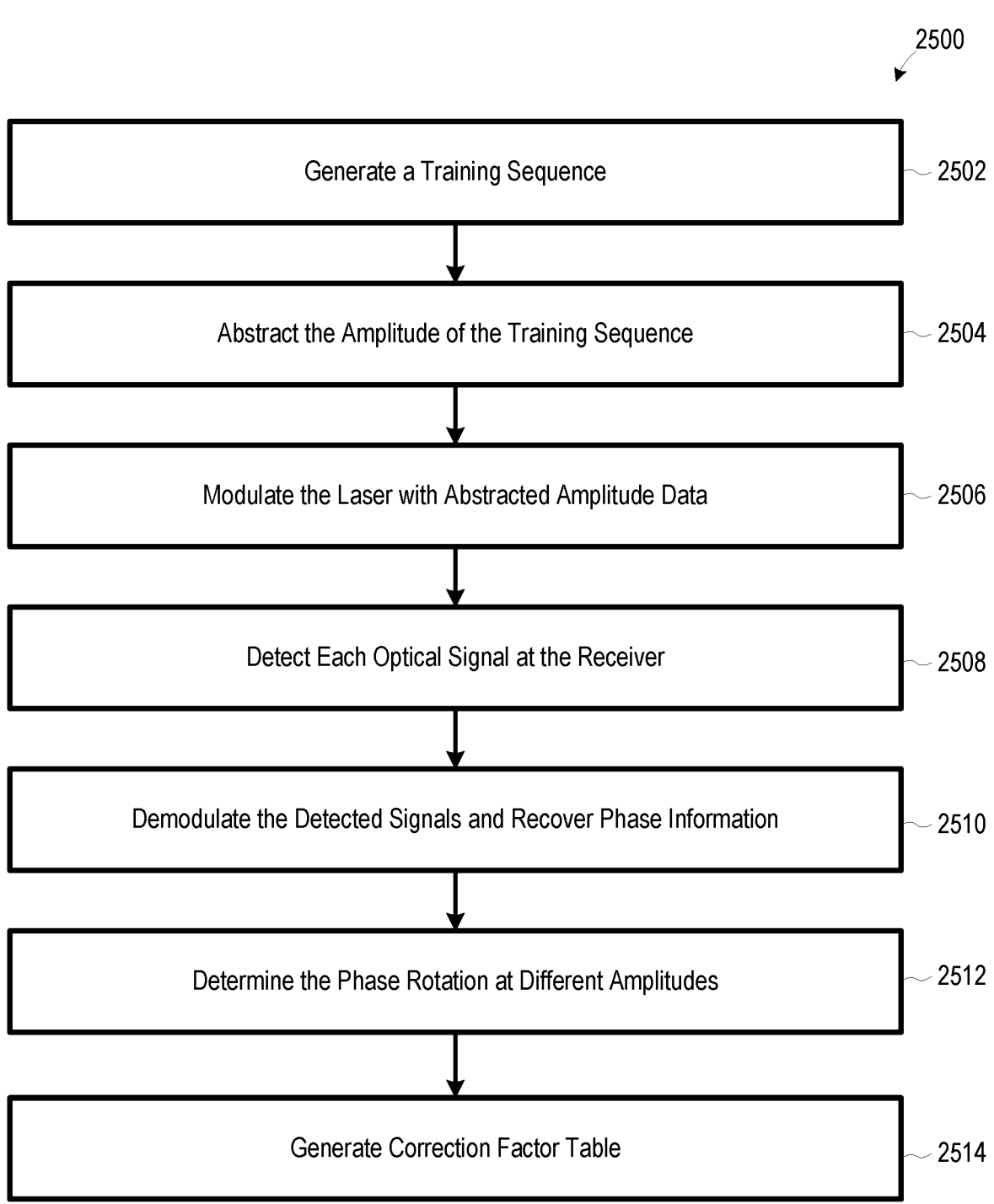
FIG. 25 is a flow chart of a method for generating correction factors, according to an embodiment.

FIG. 25 is a flow chart of a method 2500 for generating correction factors, which is one example of how correction factors Δθ can be determined on-line. In a block 2502 of method 2500, a training sequence is generated. The training sequence includes amplitude data for each possible amplitude modulation level supported by transmitter system 2102. For example, in an embodiment of transmitter system 2102 supporting 16-QAM, the training sequence may include normalized amplitude values [$\sqrt{2}$, $\sqrt{10/3}$, $\sqrt{2/3}$]. The training sequence may be generated internal to transmitter system 2102, e.g., by phase correction module 2110, or transmitter system 2102 may receive the training sequence from an external source. In a block 2504 of method 2500, amplitude and phase separation module 2112 abstracts amplitude information from the training sequence to obtain a respective amplitude value, represented by amplitude signal Q(t), for each training sequence value. In a block 2506 of method 2500, laser 2118 is modulated with the abstracted amplitude values, as represented by amplitude signal Q'(t) after amplification of amplitude signal Q(t) by driver 2114. Phase modulator 2120 is inactive during method 2500, and each optical signal 2126 is therefore essentially identical to its corresponding optical signal 2124, neglecting non-ideal effects of phase modulator 2120.

In a block 2508 of method 2500, receiver 2106 detects the optical signal 2126 corresponding to each training sequence value, to generate a respective electrical signal 2128 for each training sequence value. In a block 2510 of method 2500, demodulator 2107 demodulates each detected electrical signal 2128 and recovers a phase value for each training sequence value. In a block 2512 of method 2400, correction factor generator 2109 determines a respective phase rotation for each training sequence value from the corresponding phase value recovered in block 2512. The phase rotation for each training sequence value is equal to the recovered phase value for the training sequence value because phase modulator 2120 is inactive during method 2500. In block 2514, correction factor generator 2109 generates correction factor table 2111, where the correction factor table includes a respective correction factor 40 for each amplitude value a. Correction faction generator 2109 determines each correction factor 40, for example, by taking the opposite of the determined phase rotation for the corresponding training sequence value. Correction factor generation 2109 optionally sends 2132 correction factor table 2111 to transmitter system 2102 for use by phase correction module 2110.

Correction factor generator 2109 is implemented, for example, by a processor (not shown) executing instructions stored in a memory (not shown) to perform the functions of correction factor generator 2109. Additionally, in some embodiments, demodulator 2107 and correction factor generator 2109 are implemented by a common processor (not shown) executing instructions stored in a memory (not shown) to implement the functions of demodulator 2107 and function generator 2109. Although correction factor generation 2109 is depicted as being located at a receiver side of optical communication network 2100, correction factor generator 2109 could alternately be located at a transmitter side of optical communication network 2100, e.g., integrated with transmitter system 2102, or correction factor generator 2109 could be split between the transmitter and receiver sides of the network.

Figure 26:
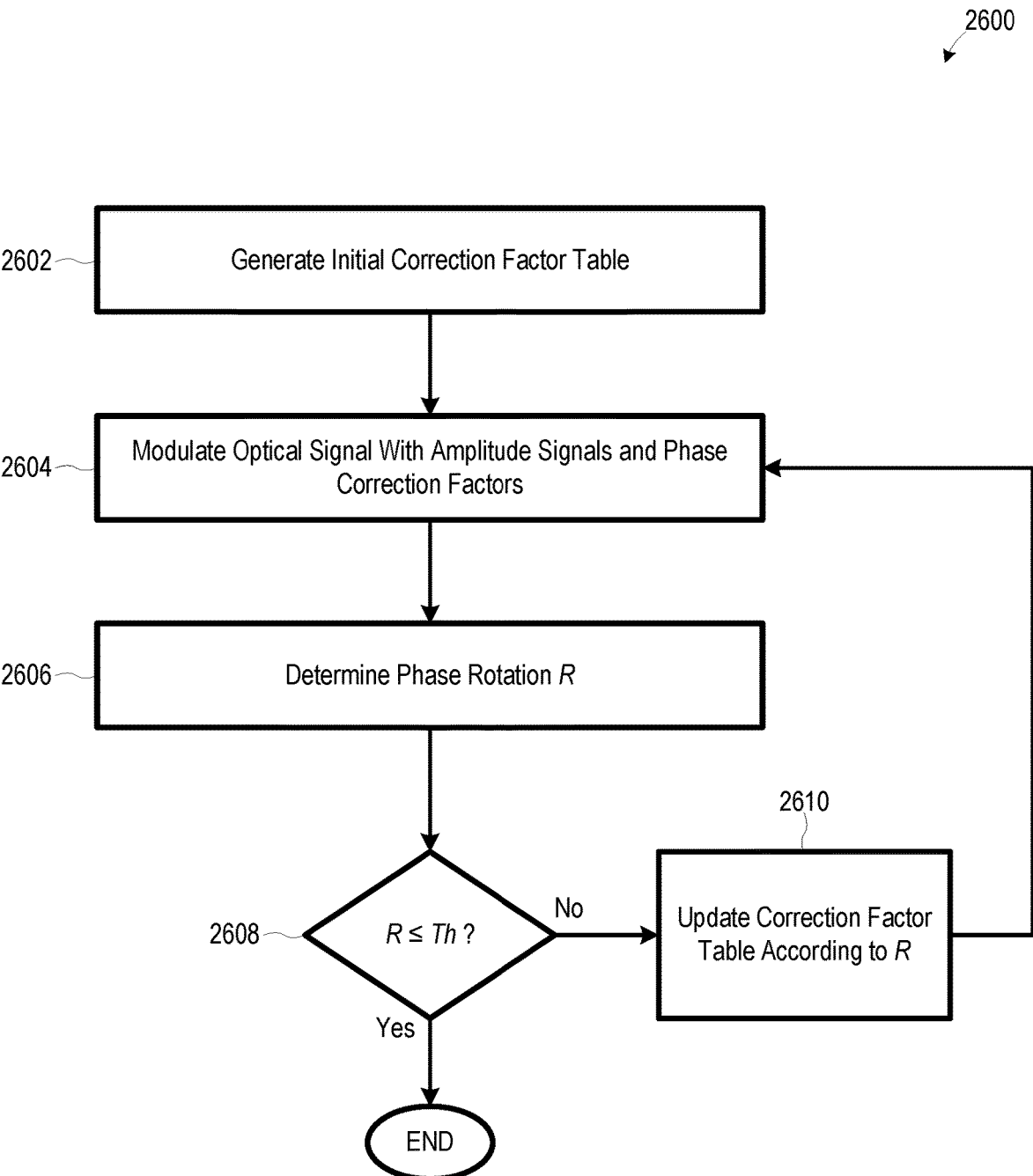
FIG. 26 is a flow chart of a method for iteratively determining correction factors, according to an embodiment.

Correction factors Δθ are optionally iteratively determined. For example, FIG. 26 is a flow chart of a method 2600 for iteratively determining correction factors Δθ. In a block 2602 of method 2600, optical communication network 2100 generates an initial correction factor table 2111, such as by using method 2500 of FIG. 25. In a block 2604 of method 2600, laser 2118 modulates optical signal 2124 with a training sequence of amplitude signals Q'(t), and phase modulator 2120 modulates optical signal 2124 with a respective correction factor 40 from table 2111 for each training sequence amplitude signal Q'(t) value. In a block 2606 of method 2600, correction factor generator 2109 determines a respective phase rotation R for each training sequence signal value using a technique similar to that discussed above with respect to block 2512 of method 2500. In a block 2608 of method 2600, correction factor generator 2109 compares each phase rotation value R to a maximum threshold value Th. If each phase rotation value R is less than or equal to maximum threshold value Th, correction factor table 2111 is considered complete, and method 2600 accordingly ends. On the other hand, if any phase rotation value R is greater than maximum threshold value Th, method 2600 proceeds to block 2610, where correction factor generator 2019 updates correction factor table 2111 according to phase rotations R determined in block 2606, to refine correction factor table 2111. For example, in some embodiments, correction factor generator 2109 adds an opposite of each phase rotation value R determined in block 2606 to a respective correction factor 40 in table 2111. Method 2610 then returns to block 2604, and blocks 2604-2610 are repeated until each phase rotation value R is less than or equal to maximum threshold value Th.

Figure 27:
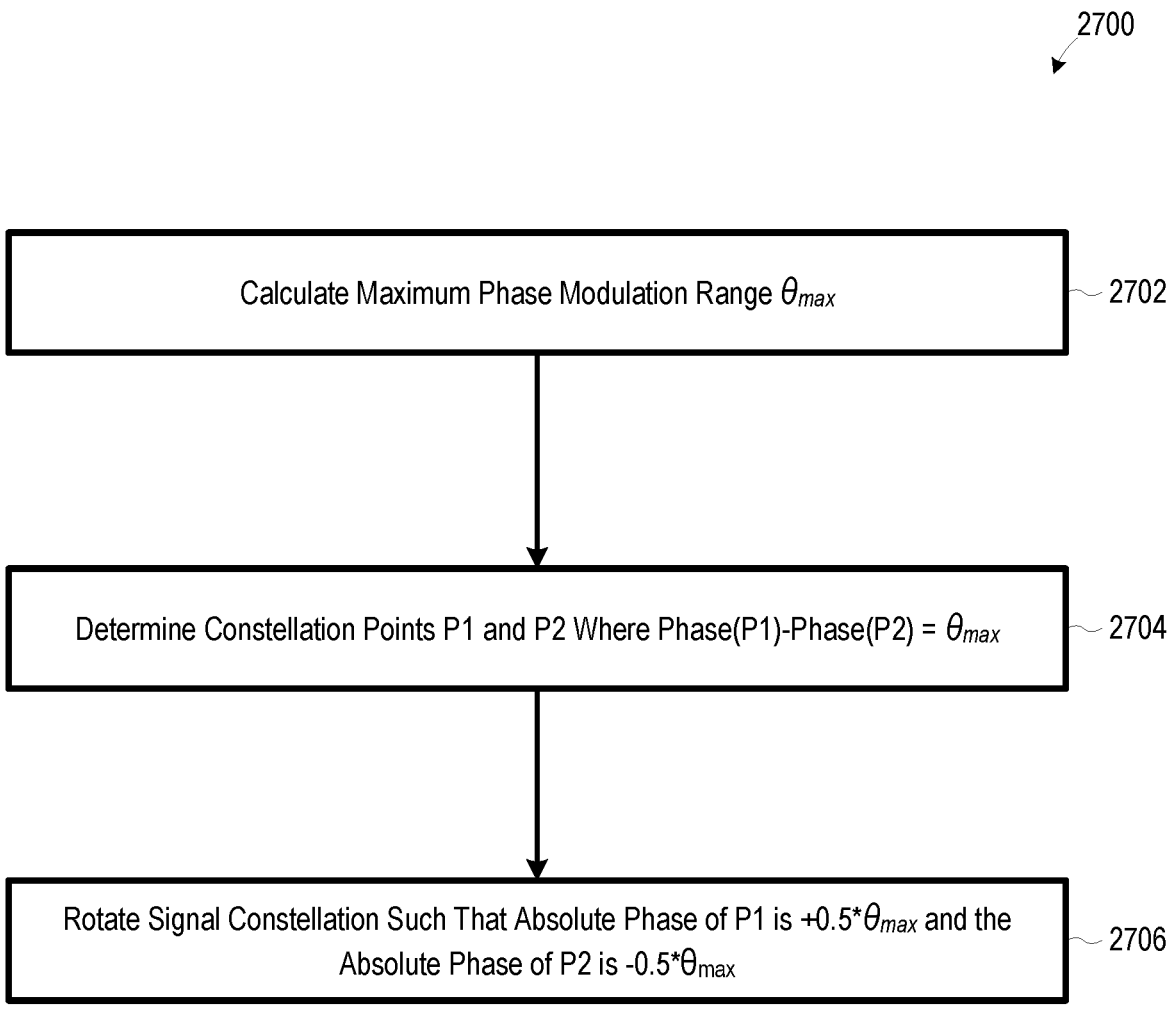
FIG. 27 is a flow chart of a method for optimizing maximum phase modulation range, according to an embodiment.

In some embodiments of transmitter system 2102, coding and mapping module 2108 is further configured rotate signal constellations, relative to their default angular positions, to optimize a phase modulation range. The phase modulation range may be optimized, for example, to reduce power required to drive phase modulator 2120 and/or to reduce or eliminate a direct current (DC) component of phase signal θ'(t). For example, FIG. 27 is a flow chart of a method 2700 for optimizing a phase modulation range. FIG. 27 is discussed below with respect to coding and mapping module 2108 performing the steps of method 2700, although method 2700 could alternately be performed by another element of transmitter system 2102 or even external to transmitter system 2102.

In a block 2702, coding and mapping module 2108 calculates a maximum phase modulation range $\theta_{max}$, which will vary with the modulation scheme used by coding and mapping module 2108. In a block 2704 of method 2700, coding and mapping module 2108 determines constellation points P1 and P2 conforming to equation Phase(P1)−Phase(P2)=$\theta_{max}$, where Phase(P1) refers to phase of constellation point P1, and Phase(P2) refers to phase of constellation point P2. In a block 2706 of method 2700, coding and mapping module 2108 rotates a signal constellation mapping performed by module 2108 such that (a) an absolute phase of constellation point P1 is $0.5*\theta_{max}$ and (b) an absolute phase of constellation point P2 is $-0.5*\theta_{max}$.

Transmitter system 2102 could be modified to implement chromatic dispersion pre-compensation, as well as phase rotation compensation. For example, phase correction module 2120 could be configured to distort modulated signal s(t) according to an inverse of a transmission function H of optical communication network 2100, such as a manner analogous to that discussed above with respect to FIG. 6, as well as to modify phase of modulated signal s(t) by a correction factor $\Delta\theta(a)$ to compensate for phase rotation exhibited by laser 2118.

Transmitter system 2102 is not limited to use in the optical communication networks of FIGS. 21, 23, and 24. To the contrary, transmitter system 2102 could be used in essentially any optical communication network, including but not limited to a long-haul optical communication network, a mid-haul optical communication network, a front-haul optical communication network, a back-haul optical communication network, a metro optical communication network, an access optical communication network, an optical communication network within a building, such as an optical communication network within a data center, and a hyperscale computing environment. Discussed below with respect to FIGS. 28-31 are several example applications of transmitter system 2102, although it is understood that transmitter system 2102 is not limited to these example applications. Details of transmitter system 2102 are not shown in FIGS. 28-31 for illustrative clarity. Transmitter system 2102 in FIGS. 28-31 could be replaced with transmitter system 602 of FIG. 6 without departing from the scope hereof.

Figure 28:
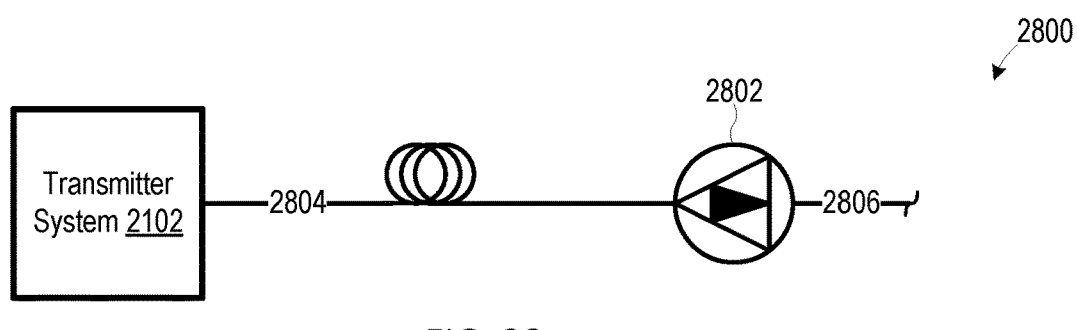
FIG. 28 is a block diagram of a communication network including a fiber node and an instance of a transmitter system of FIG. 21.

FIG. 28 is a block diagram of a communication network 2800 including an instance of transmitter system 2102, a fiber node 2802, an optical cable 2804, and one or more electrical cables 2806. Optical cable 2804 communicatively couples transmitter system 2102 to fiber node 2802, and fiber node 2802 serves as a receiver for transmitter system 2102. Fiber node 2802 is configured to convert optical signals on optical cable 2804 to electrical signals on one or more electrical cables 2806. Electrical cables 2806 include, for example, one or more coaxial electrical cables or twisted pair electrical cables (e.g., Ethernet cables or telephone cables). In some embodiments, fiber node 2802 is a cable fiber node, a telecommunications remote terminal, an optical network unit (ONU), or an optical network termination (ONT).

Figure 29:
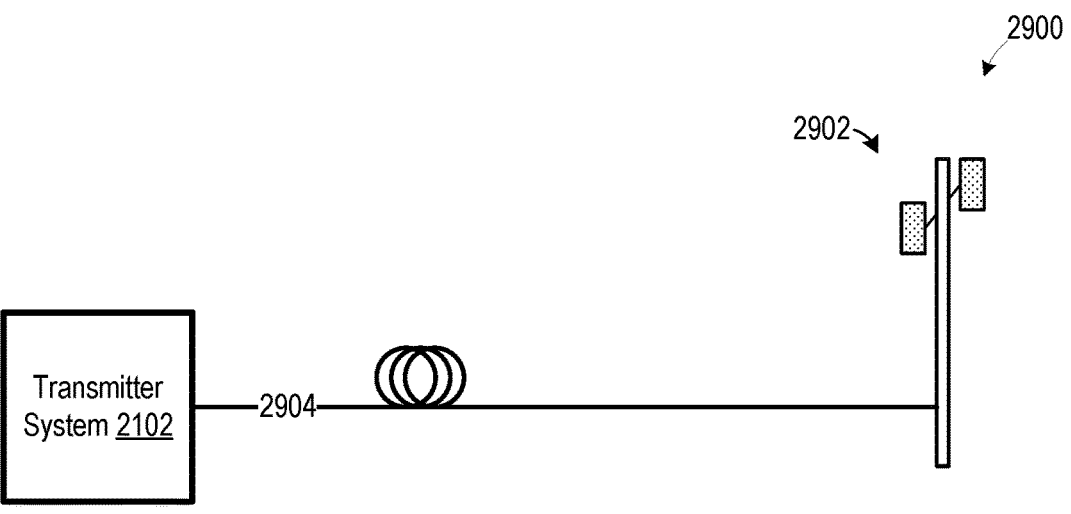
FIG. 29 is a block diagram of a communication network including a wireless base station and an instance of the transmitter system of FIG. 21.

FIG. 29 is a block diagram of a communication network 2900 including an instance of transmitter system 2102, a wireless base station 2902, and an optical cable 2904. Optical cable 2904 communicatively couples transmitter system 2102 to wireless base station 2902, and wireless base station 2902 serves as a receiver for transmitter system 2102. Wireless base station 2902 includes, for example, a third generation (3G) cellular wireless base station, a fourth generation (4G) cellular wireless base station, a fifth generation (5G) cellular wireless base station, a sixth generation (6G) cellular wireless base station, and/or a Wi-Fi wireless base station.

Figure 30:
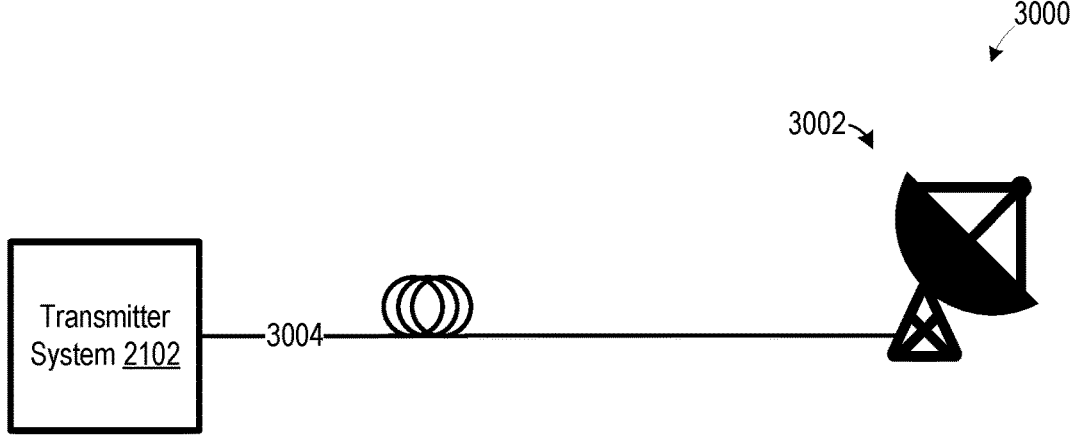
FIG. 30 is a block diagram of a communication network including a satellite ground station and an instance of the transmitter system of FIG. 21.

FIG. 30 is a block diagram of a communication network 3000 including an instance of transmitter system 2102, a satellite ground station 3002, and an optical cable 3004. Optical cable 3004 communicatively couples transmitter system 2102 to satellite ground station 3002, and satellite ground station 3002 serves as a receiver for transmitter system 2102.

FIG. 31 is a block diagram of a communication network 3100 including a server 3102, a server 3104, and an optical cable 3106. Server 3102 include an instance of transmitter system 2102. Optical cable 3106 communicatively couples transmitter system 2102 to server 3104, and server 3104 serves as a receiver for transmitter system 2102. Communication network 3100, is for example, a communication network in a data center and/or a communication network in a hyperscale computing environment.

Example Experimental Results

Figure 33:
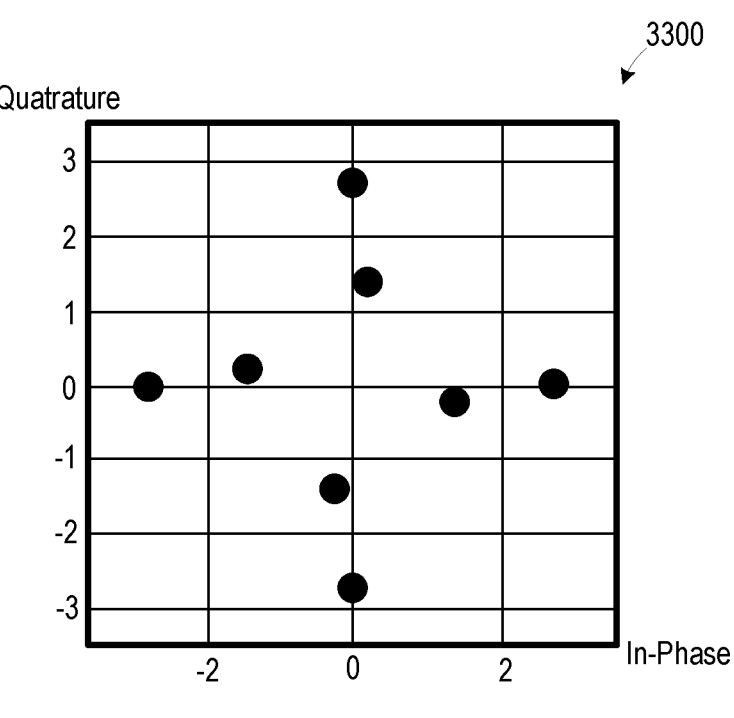
FIG. 33 is a scatter plot of actual constellation mapping of the transmitter system considered in FIG. 32, with phase compensation implemented.
Figure 34:
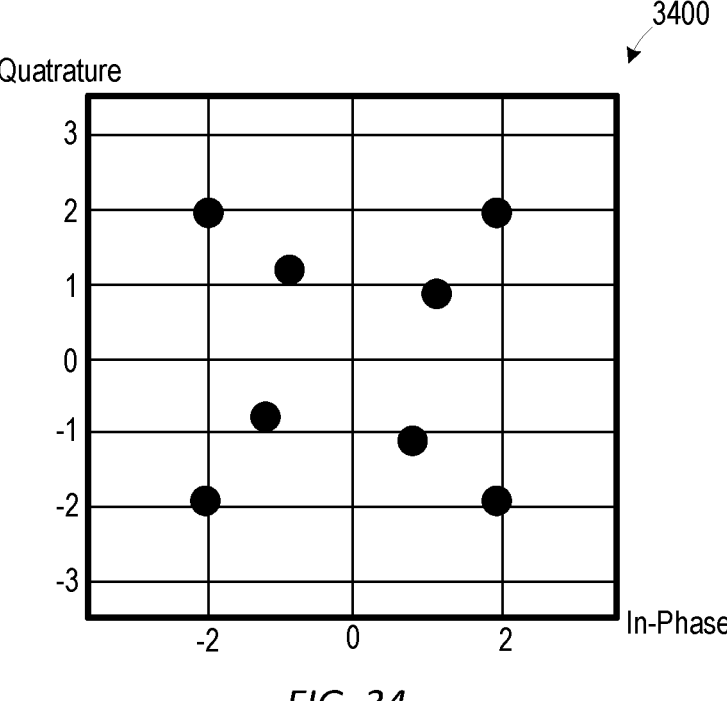
FIG. 34 is a scatter plot of actual constellation mapping of the transmitter system considered in FIG. 32, with phase compensation and signal constellation rotation implemented.

Discussed below with respect to FIGS. 32-34 are simulation results of a couple of embodiments of communication network 2100. It is appreciated, though, that communication network 2100 need not necessarily perform as indicated in these simulation results. To the contrary, performance of communication network 2100 will vary depending on the specific configuration and operating conditions of the communication network.

FIG. 32 is a scatter plot 3200 of a target (ideal) constellation mapping of an embodiment of transmitter system 2100 where coding and mapping module 2108 implements 8-QAM modulation. FIG. 33 is a scatter plot 3300 of an actual constellation mapping of an embodiment of transmitter system 2100 where coding and mapping module 2108 implements 8-QAM modulation and phase correction module 2110 is configured to modify modulated signal s(t) by the correction factors shown in Table 1 below, where "sqrt" represents the square root operator.

TABLE 1

| Amplitude | Correction Factor $\Delta\theta$ |
|---|---|
| Amplitude 1: [sqrt(3)+1] | 0 |
| Amplitude 2: [sqrt(2)] | $+0.2\pi$ |

FIG. 34 is a scatter plot 3400 of an actual constellation mapping of an embodiment of transmitter system 2100 where (1) coding and mapping module 2108 implements 8-QAM modulation, (2) coding and mapping module 2108 rotates signal constellation mapping by $0.2*\pi$ to optimize a phase modulation range of the signal constellation, and (3) phase correction module 2110 is configured to modify modulated signal s(t) by the correction factors shown in Table 1 above.

Further Examples

Figure 35:
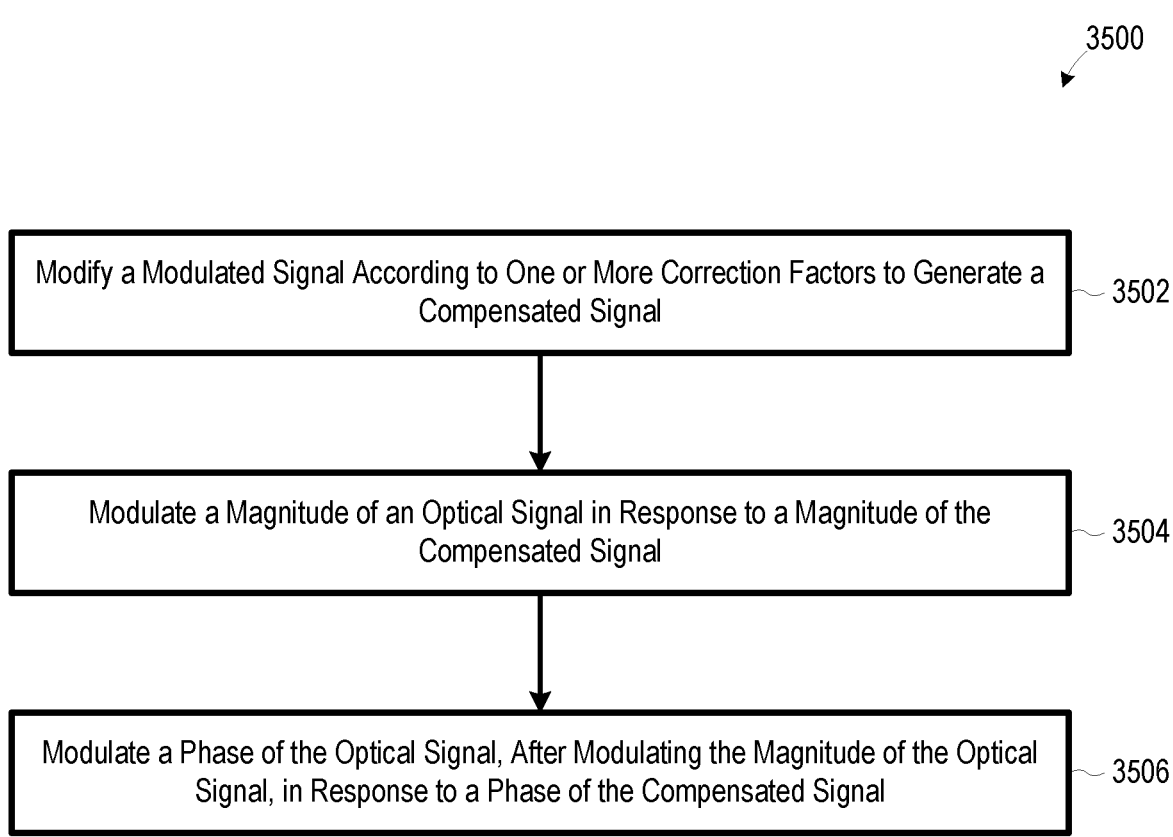
FIG. 35 is a flow chart of a method for phase compensation in an optical communication network.

Discussed below with respect to FIG. 35 are additional examples of operation of communication network 2100. It is appreciated however, that communication network 2100 is not limited to operating according to these examples.

FIG. 35 is a flow chart of a method 3500 for phase compensation in an optical communication network. In a block 3502 of method 3500, a modulated signal is modified according to one or more correction factors to generate a compensated signal, to compensate for phase rotation in the optical communication network. In one example of block 3502, phase correction module 2110 modifies modulated signal s(t) according to one or more correction factors $\Delta\theta$ to generate compensated signal p(t), to compensate for phase rotation of laser 2118. In a block 3504 of method 3500, a magnitude of an optical signal is modulated in response to a magnitude of the compensated signal. In example of block 3504, laser 2118 modulates magnitude of optical signal 2124 in response to amplitude signal Q'(t). In a block 3506 of method 3500, a phase of the optical signal is modulated, after modulating the magnitude of the optical signal, in response to a phase of the compensated signal. In one example of bock 3506, phase of optical signal 2124 is modified in response to phase signal θ'(t).

Features described above may be combined in various ways without departing from the scope hereof. The following examples illustrate some possible combinations.

(A1) A method for chromatic dispersion pre-compensation in an optical communication network may include (1) distorting an original modulated signal according to an inverse of a transmission function of the optical communication network, to generate a compensated signal, (2) modulating a magnitude of an optical signal in response to a magnitude of the compensated signal, and (3) modulating a phase of the optical signal, after modulating the magnitude of the optical signal, in response to a phase of the compensated signal.

(A2) In the method denoted as (A1), modulating the magnitude of the optical signal in response to the magnitude of the compensated signal may include controlling a laser in response to the magnitude of the compensated signal, and modulating the phase of the optical signal in response to the phase of the compensated signal may include controlling a phase modulator, that is separate from the laser, in response to the phase of the compensated signal.

(A3) In the method denoted as (A2), the laser may be a directly-modulated laser (DML).

(A4) In the method denoted as (A2), the laser may be a coherent optical injection locking (COIL) laser.

(A5) Any one of the methods denoted as (A1) through (A4) may further include matching a clock of the phase modulator with a clock of the laser.

(A6) In the method denoted as (A5), matching the clock of the phase modulator with the clock of the laser may include adding a delay to the phase of the compensated signal, before modulating the phase of the optical signal in response to the phase of the compensated signal.

(A7) In any one of the methods denoted as (A1) through (A6), distorting the original modulated signal according to the inverse of the transmission function of the optical communication network may include convolving the original modulated signal with a time domain filter function.

(A8) The method denoted as (A7) may further include converting the transmission function of the optical communication network from a frequency domain to a time domain, to generate the time domain filter function.

(A9) In any one of the methods denoted (A1) through (A6), distorting the original modulated signal according to the inverse of the transmission function of the optical communication network may include: (1) dividing the original modulated signal into a plurality of blocks, (2) adding leading and trailing zeros to each block, (3) converting each block from a time domain to a frequency domain, (4) after converting each block to the frequency domain, multiplying each block by the inverse of the transmission function of the optical communication network to obtain a respective frequency domain filtered block. (5) converting each frequency domain filtered block to a time domain filtered block, and (6) summing the time domain filtered blocks to obtain the compensated signal.

(A10) The method denoted as (A9) may further include, before summing the time domain filtered blocks to obtain the compensated signal, partially overlapping adjacent time domain filtered blocks in the time domain.

(A11) In the method denoted as (A10), partially overlapping adjacent time domain filtered blocks in the time domain may include overlapping adjacent time domain filtered blocks such that for each pair of immediately adjacent time domain filtered blocks, a portion of a first block of the pair associated with trailing zeros overlaps a portion of a second block of the pair associated with leading zeros.

(A12) Any one of the methods denoted as (A1) through (A11) may further include transmitting the optical signal to a receiver via an optical cable, after modulating the phase of the optical signal.

(A13) The method denoted as (A12) may further include recovering an input signal from the optical signal to generate an output signal.

(A14) The method denoted as (A13) may further include performing non-linear compensation of the output signal.

(B1) A transmitter system configured to perform chromatic dispersion pre-compensation may include (1) a signal generator configured to distort an original modulated signal according to an inverse of a transmission function of an optical communication network, to generate a compensated signal, (2) a laser configured to modulate an amplitude of an optical signal in response to a magnitude of the compensated signal, and (3) a phase modulator disposed downstream of the laser with respect to the optical signal, the phase modulator being configured to modulate a phase of the optical signal in response to a phase of the compensated signal.

(B2) The transmitter system denoted as (B1) may further include a tunable delay line configured to add a delay to the phase of the compensated signal, before the phase modulator modulates the phase of the optical signal in response to the phase of the compensated signal.

(B3) In any one of the transmitter systems denoted as (B1) or (B2), the laser may include a directly-modulated laser (DML).

(B4) In any one of the transmitter systems denoted as (B1) or (B2), the laser may include a coherent optical injection locking (COIL) laser.

(B5) In any one of the transmitter systems denoted as (B1) through (B4), the signal generator may be configured to distort the original modulated signal according to the inverse of the transmission function of the optical communication network by convolving the original modulated signal with a time domain filter function.

(B6) In any one of the transmitter systems denoted as (B1) through (B4), the signal generator may be configured to distort the original modulated signal according to the inverse of the transmission function of the optical communication network by: (1) dividing the original modulated signal into a plurality of blocks, (2) adding leading and trailing zeroes to each block, (3) converting each block from a time domain to a frequency domain, (4) after converting each block to the frequency domain, multiplying each block by the inverse of the transmission function of the optical communication network to obtain a respective frequency domain filtered block, (5) converting each frequency domain filtered block to a time domain filtered block, and (6) summing the time domain filtered blocks to obtain the compensated signal.

(C1) A method for phase compensation in an optical communication network includes (1) modifying a modulated signal according to one or more correction factors to generate a compensated signal, to compensate for phase rotation, (2) modulating a magnitude of an optical signal in response to a magnitude of the compensated signal, and (3)

modulating a phase of the optical signal, after modulating the magnitude of the optical signal, in response to a phase of the compensated signal.

(C2) In the method denoted as (C1), modulating the magnitude of the optical signal in response to the magnitude of the compensated signal may include controlling a laser in response to the magnitude of the compensated signal, and modulating the phase of the optical signal in response to the phase of the compensated signal may include controlling a phase modulator, that is separate from the laser, in response to the phase of the compensated signal.

(C3) In any one of the methods denoted as (C1) and (C2), the phase rotation may include phase rotation of the laser of the optical communication network.

(C4) In any one of the methods denoted as (C2) through (C3), the laser may be a directly-modulated laser (DML).

(C5) In any one of the methods denoted as (C2) through (C3), the laser may be a coherent optical injection locking (COIL) laser.

(C6) Any one of the methods denoted as (C2) through (C5) may further include determining the one or more correction factors.

(C7) The method denoted as (C6) may further include determining the one or more correction factors at least partially from phase rotation values of the laser.

(C8) The method denoted as (C6) may further include determining the one or more correction factors such that each of the one or more correction factors is opposite of a respective phase rotation values exhibited by the laser.

(C9) Any one of the methods denoted as (C1) through (C8) may further include modulating a carrier signal according to an input electrical signal to generate the modulated signal.

(C10) The method denoted as (C9) may further include rotating a signal constellation of the modulated signal, before modifying the modulated signal according to one or more correction factors.

(C11) The method denoted as (C10) may further include (1) calculating a maximum phase modulation range $\theta_{max}$ when modulating the carrier signal according to the input electrical signal, (2) determining signal constellation points P1 and P2 such that equation $Phase(P1)-Phase(P2)=\theta_{max}$ holds true, and (3) rotating the signal constellation such that (i) an absolute phase of constellation point P1 is $0.5*\theta_{max}$, and (ii) an absolute phase of constellation point P2 is $-0.5*\theta_{max}$.

(C12) Any one of the methods denoted as (C1) through (C11) may further include recovering an input signal from the optical signal, to generate an output signal.

(D1) A transmitter system configured to perform phase compensation includes (1) a phase correction module configured to modify a modulated signal according to one or more correction factors to generate a compensated signal, to compensate for phase rotation, (2) a laser configured to modulate an amplitude of an optical signal in response to a magnitude of the compensated signal, and (3) a phase modulator disposed downstream of the laser with respect to the optical signal, the phase modulator being configured to modulate a phase of the optical signal in response to a phase of the compensated signal.

(D2) In the transmitter system denoted as (D1), the laser may include a directly-modulated laser (DML).

(D3) In the transmitter system denoted as (D1), the laser may include a coherent optical injection locking (COIL) laser.

(D4) In any one of the transmitter systems denoted as (D1) through (D3), the phase rotation may include phase rotation of the laser of the optical communication network.

(D5) In any one of the transmitter systems denoted as (D1) through (D4), the one or more correction factors may be opposite of respective phase rotation values exhibited by the laser.

(D6) Any one of the transmitter systems denoted as (D1) through (D5) may further include a coding and mapping module configured to modulate a carrier signal according to an input electrical signal, to generate the modulated signal.

(D7) In the transmitter system denoted as (D6), the coding and mapping module may be further configured to rotate a signal constellation of the modulated signal.

(D8) In the transmitter system denoted as (D7), the coding and mapping module may be further configured to rotate the signal constellation of the modulated signal such that (1) an absolute phase of a constellation point P1 is $0.5*\theta_{max}$, (2) an absolute phase of a constellation point P2 is $-0.5*\theta_{max}$, (3) constellation points P1 and P2 comply with equation $Phase(P1)-Phase(P2)=\theta_{max}$, and (4) $\theta_{max}$ is a maximum phase modulation range of the coding and mapping module.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for phase compensation in an optical communication network, the method comprising:
   generating a compensated signal by modifying a modulated signal by one or more correction factors, to compensate for variation in phase of an optical signal within the optical communication network;
   separating the compensated signal into an amplitude signal and a phase signal;
   controlling a laser to modulate a magnitude of the optical signal in response to the amplitude signal; and
   modulating the phase of the optical signal, after modulating the magnitude of the optical signal, in response to the phase signal.

2. The method of claim 1, wherein modulating the phase of the optical signal in response to the phase signal comprises controlling a phase modulator, that is separate from the laser, in response to the phase of the phase signal.

3. The method of claim 1, wherein the variation in the phase of the optical signal comprises phase rotation of the laser.

4. The method of claim 1, wherein the laser is a directly-modulated laser (DML).

5. The method of claim 1, wherein the laser is a coherent optical injection locking (COIL) laser.

6. The method of claim 1, further comprising determining the one or more correction factors.

7. The method of claim 1, further comprising determining the one or more correction factors at least partially from phase rotation values of the laser.

8. The method of claim 1, further comprising determining the one or more correction factors for use in generating the compensated signal, such that each of the one or more correction factors is opposite of a respective phase rotation value exhibited by the laser.

9. The method of claim 1, further comprising modulating a carrier signal according to an input electrical signal to generate the modulated signal.

10. The method of claim 9, further comprising rotating a signal constellation of the modulated signal.

11. The method of claim 10, further comprising:

calculating a maximum phase modulation range $\theta_{max}$ when modulating the carrier signal according to the input electrical signal;

determining signal constellation points P1 and P2 such that equation Phase(P1)−Phase(P2)=$\theta_{max}$ holds true; and rotating the signal constellation such that:

an absolute phase of constellation point P1 is 0.5*$\theta_{max}$, and an absolute phase of constellation point P2 is −0.5*$\theta_{max}$.

12. The method of claim 1, further comprising recovering an input signal from the optical signal, to generate an output signal.

13. A transmitter system configured to perform phase compensation, comprising:

a laser configured to modulate an amplitude of an optical signal in response to a magnitude of a compensated signal;

a phase modulator disposed downstream of the laser with respect to the optical signal, the phase modulator being configured to modulate a phase of the optical signal in response to a phase of the compensated signal; and a phase correction module configured to generate the compensated signal to compensate for variation in phase of the optical signal caused at least partially by controlling the laser to modulate the magnitude of the optical signal.

14. The transmitter system of claim 13, wherein the laser comprises a directly-modulated laser (DML).

15. The transmitter system of claim 13, wherein the laser comprises a coherent optical injection locking (COIL) laser.

16. The transmitter system of claim 13, wherein the variation in phase of the optical signal comprises phase rotation of the laser.

17. The transmitter system of claim 13, further comprising a coding and mapping module configured to modulate a carrier signal according to an input electrical signal, to generate a modulated signal for use by the phase correction module to generate the compensated signal.

18. The transmitter system of claim 17, wherein the coding and mapping module is further configured to rotate a signal constellation of the modulated signal.

19. The transmitter system of claim 18, wherein the coding and mapping module is further configured to rotate the signal constellation of the modulated signal such that:

an absolute phase of a constellation point P1 is 0.5*$\theta_{max}$;

an absolute phase of a constellation point P2 is −0.5*$\theta_{max}$;

constellation points P1 and P2 comply with equation Phase(P1)−Phase(P2)=$\theta_{max}$; and $\theta_{max}$ is a maximum phase modulation range of the coding and mapping module.

20. The transmitter system of claim 13, further comprising:

a first driver configured to amplify an amplitude signal representing the magnitude of the compensated signal, for use by the laser; and a second driver configured to amplify a phase signal representing the phase of the compensated signal, for use by the phase correction module.

* * * * *